(12) United States Patent
Skotty et al.

(10) Patent No.: US 10,997,837 B1
(45) Date of Patent: *May 4, 2021

(54) INTEGRATED HOME LIGHTING AND NOTIFICATION SYSTEM

(71) Applicant: HeathCo, LLC, Bowling Green, KY (US)

(72) Inventors: Brian Roy Skotty, Elmhurst, IL (US); Scott Blaise Tylicki, Bowling Green, KY (US)

(73) Assignee: HEATHCO, LLC, Bowling Green, KY (US)

( * ) Notice: Subject to any disclaimer, the term of this patent is extended or adjusted under 35 U.S.C. 154(b) by 365 days.

This patent is subject to a terminal disclaimer.

(21) Appl. No.: 16/112,393

(22) Filed: Aug. 24, 2018

Related U.S. Application Data

(63) Continuation-in-part of application No. 15/367,991, filed on Dec. 2, 2016, now Pat. No. 10,062,256, which is a continuation of application No. 14/806,763, filed on Jul. 23, 2015, now Pat. No. 9,547,964.

(60) Provisional application No. 62/028,675, filed on Jul. 24, 2014.

(51) Int. Cl.
*G08B 13/196* (2006.01)
*H05B 47/19* (2020.01)
*H05B 47/105* (2020.01)
*G08B 19/00* (2006.01)

(52) U.S. Cl.
CPC . *G08B 13/19695* (2013.01); *G08B 13/19632* (2013.01); *H05B 47/105* (2020.01); *H05B 47/19* (2020.01); *G08B 19/005* (2013.01)

(58) Field of Classification Search
CPC ............................ G08B 13/196; G08B 13/19; G08B 13/19632; G08B 13/19678; G08B 13/19684; G08B 13/19695; H05B 47/19; H05B 47/105; H05B 37/0227
USPC .......... 340/541, 517, 555, 5.1, 5.2; 348/143, 348/148, 152
See application file for complete search history.

(56) References Cited

U.S. PATENT DOCUMENTS

| | | | |
|---|---|---|---|
| 4,360,807 A | 11/1982 | Zettergren | |
| 4,464,651 A | 8/1984 | Duhame | |
| 6,025,785 A | 2/2000 | Farris et al. | |
| 6,658,091 B1 | 12/2003 | Naidoo et al. | |
| 7,113,090 B1 | 9/2006 | Saylor et al. | |
| 7,193,644 B2 | 3/2007 | Carter | |
| 7,205,892 B2 | 4/2007 | Luebke et al. | |
| 7,468,676 B2 | 12/2008 | Styers et al. | |
| 7,532,709 B2 | 5/2009 | Styers et al. | |
| 7,602,283 B2 | 10/2009 | John | |
| 7,710,284 B2 | 5/2010 | Dzurko et al. | |
| 7,869,582 B2 | 1/2011 | Styers et al. | |

(Continued)

OTHER PUBLICATIONS

PCT Application No. PCT/US15/22742; International Search Report and Written Opinion dated Jul. 10, 2015.

*Primary Examiner* — Hung T Nguyen
(74) *Attorney, Agent, or Firm* — Middleton Reutlinger

(57) ABSTRACT

An integrated lighting and notification system includes a light fixture connected to an electrical power supply, a camera, a control unit, and a trigger device. The electrical power supply provides electrical power to the light source unit and the camera. The control unit transmits a signal via a network in response to receiving a signal transmitted by the trigger device.

20 Claims, 11 Drawing Sheets

(56) References Cited

U.S. PATENT DOCUMENTS

| | | | |
|---|---|---|---|
| 8,139,098 B2 | 3/2012 | Carter | |
| 8,144,183 B2 | 3/2012 | Carter | |
| 8,144,184 B2 | 3/2012 | Carter | |
| 8,154,581 B2 | 4/2012 | Carter | |
| 8,164,614 B2 | 4/2012 | Carter | |
| 8,218,739 B2 | 7/2012 | Styers et al. | |
| 8,345,846 B2 | 1/2013 | Nassimi | |
| 8,410,930 B2 | 4/2013 | Karasek et al. | |
| 8,421,624 B2 * | 4/2013 | Hsu | G08B 25/14 340/541 |
| 8,648,538 B2 * | 2/2014 | Yoon | H05B 47/16 315/158 |
| 8,780,201 B1 | 7/2014 | Scalisi et al. | |
| D711,275 S | 8/2014 | Scalisi | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 9,143,741 B1 | 9/2015 | Fu et al. | |
| 9,172,917 B1 * | 10/2015 | Fu | H04N 5/2253 |
| 9,547,964 B2 | 1/2017 | Skotty | |
| 2003/0025605 A1 | 2/2003 | Prins | |
| 2003/0071590 A1 | 4/2003 | Roman | |
| 2003/0140107 A1 | 7/2003 | Rezvani et al. | |
| 2004/0212498 A1 | 10/2004 | Peterson et al. | |
| 2005/0285734 A1 | 12/2005 | Sheynman et al. | |
| 2007/0103541 A1 | 5/2007 | Carter | |
| 2007/0103542 A1 | 5/2007 | Carter | |
| 2007/0103548 A1 | 5/2007 | Carter | |
| 2007/0109763 A1 * | 5/2007 | Wolf | H05B 47/12 362/86 |
| 2008/0079562 A1 | 4/2008 | Gioia et al. | |
| 2008/0079810 A1 | 4/2008 | Fitzgibbon | |
| 2008/0117299 A1 | 5/2008 | Carter | |
| 2012/0262581 A1 | 10/2012 | Carter | |
| 2014/0068486 A1 | 3/2014 | Sellers et al. | |
| 2014/0125499 A1 | 5/2014 | Cate et al. | |
| 2014/0266669 A1 | 9/2014 | Fadell et al. | |
| 2015/0029335 A1 | 1/2015 | Kasmir et al. | |
| 2015/0222852 A1 | 8/2015 | Carter | |
| 2016/0021152 A1 | 1/2016 | Maguire et al. | |

* cited by examiner

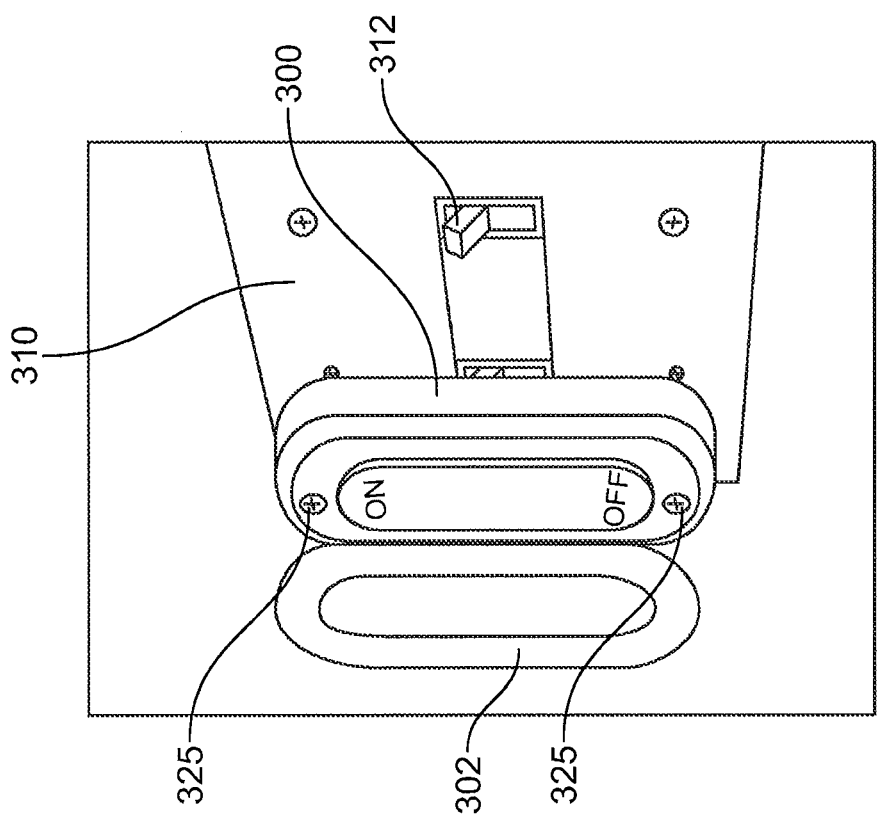
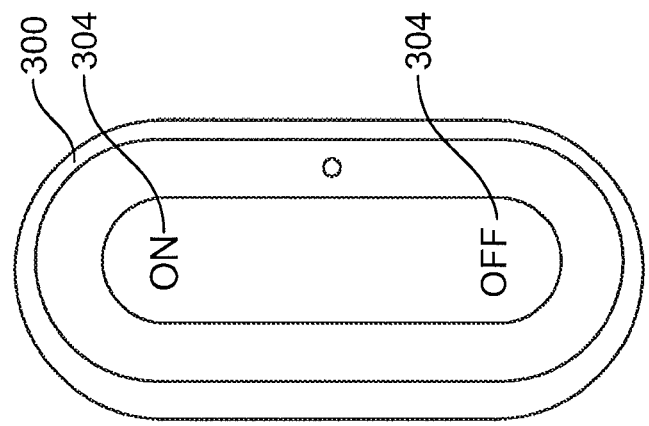
FIG. 7A
FIG. 7B

INTEGRATED HOME LIGHTING AND NOTIFICATION SYSTEM

TECHNICAL FIELD

The present disclosure generally relates to lighting and notification systems. More specifically, the present disclosure relates monitoring, notification, and communication equipment integrated into home lighting apparatuses and systems.

BACKGROUND

Home security systems can be expensive and complicated to install in a home.

Installation of such systems may involve providing a separate power source to the equipment operating the system. For example, the equipment of the notification system may operate via batteries locally installed in each piece of equipment. Maintenance of such systems will therefore involve periodic replacement of the batteries.

Other home security systems may be equipped with a power cord that can be plugged into a power supply outlet. These systems can result in unsightly power cords hanging about the home entryway. Not only does this provide an aesthetically displeasing system, the exposed cords are at risk to being accidentally unplugged or damaged.

Other sophisticated systems can be directly wired into the home's A/C power supply. Such systems involve complicated electrical wiring within the walls of a home which makes installation difficult and expensive, and also makes it difficult to move the equipment after installation.

SUMMARY

The present disclosure describes examples of an integrated lighting and notification apparatus. In some examples, the apparatus includes a light source unit installable within a light fixture that is connected to an electrical power supply. In this manner, the electrical power supply provides electrical power to the light source unit when the light source unit is installed in the light fixture. The apparatus also includes a motion sensor to detect motion at the building entryway, and a camera for capturing digital images. The motion sensor and the camera are in electrical communication with the light source unit and thus, in turn, to the electrical power supply. The apparatus also includes a trigger device (e.g., a doorbell activation interface) that can be used to detect an event of interest at the entryway, and to communicate a signal in response to a trigger event. The apparatus also includes a control unit. The control unit communicates with the components of the apparatus (e.g., the light source unit, the camera, the motion sensor, the trigger device, and/or other equipment).

In operation, the light source provides electrical power from the electrical power supply to the motion sensor and the camera. For example, when the light source unit is installed in the light fixture, the light source unit delivers power from the electrical power supply (which also supplies power to the light source itself) to the equipment integrated into the light source unit, such as the camera, the motion sensor, and the light sensor when provided.

The control unit effects the capture of digital images by the camera. For example, the control unit can send instructions or other signals to the camera, causing the camera to operate and capture images. The control unit can be configured to effect the image capture in response to detected events, such as the motion sensor detecting motion at the building entryway, a detected increase/decrease in the lighting level at the entryway, or a detected attempt to open a door or ring a doorbell at the entryway.

The control unit also effects transmission of a notification signal via a network. For example, the control unit can send (or cause a related communication device to send) a signal to a mobile device (e.g., a smart phone), via a network. The control unit can be configured to automatically transmit, or effect the transmission of, such a signal in response to certain trigger events. For example, the control unit can be configured to transmit a notification signal in response to receiving a signal transmitted by the trigger device.

Some examples described herein also integrate multiple light source units so that they communicate with one another. For instance, certain examples employ a primary light source unit that incorporates features including a camera, a trigger device, and sensors, along with one or more secondary light sources. The secondary light source units communicate with the primary light source, either directly or through a control unit, so that the light intensity of the secondary light source units adjusts based on communications or associations with the primary light source unit.

BRIEF DESCRIPTION OF THE DRAWINGS

FIG. 7A shows an example of a wireless light control switch installed over a light switch for use with one or more examples of a lighting and notification system described herein.

FIG. 7B is a front view of an example of the wireless light control switch of FIG. 7A.

DETAILED DESCRIPTION

Integrating a security or surveillance system with a notification system can be complicated and inefficient. For example, surveillance systems may be equipped to constantly record and/or stream video. However, when video is constantly recorded, a vast majority of the recorded footage is likely to be unhelpful and uninteresting. In such a situation, a user viewing the video feed at a given moment will likely not be presented with interesting or informative information. Moreover, user seeking to review footage of a certain event may have to comb through countless hours of uninteresting video to find the actual footage of interest.

A surveillance system can also utilize sensors or detectors as a trigger to signal users that recorded video may be of interest. However, these systems can generate a distracting number of alarms because ordinary, uninteresting events may activate the sensors or detectors. For example, falling leaves or a passing pedestrian may activate the motion sensor and trigger the transmission of a meaningless and distracting notification.

Figure 1:
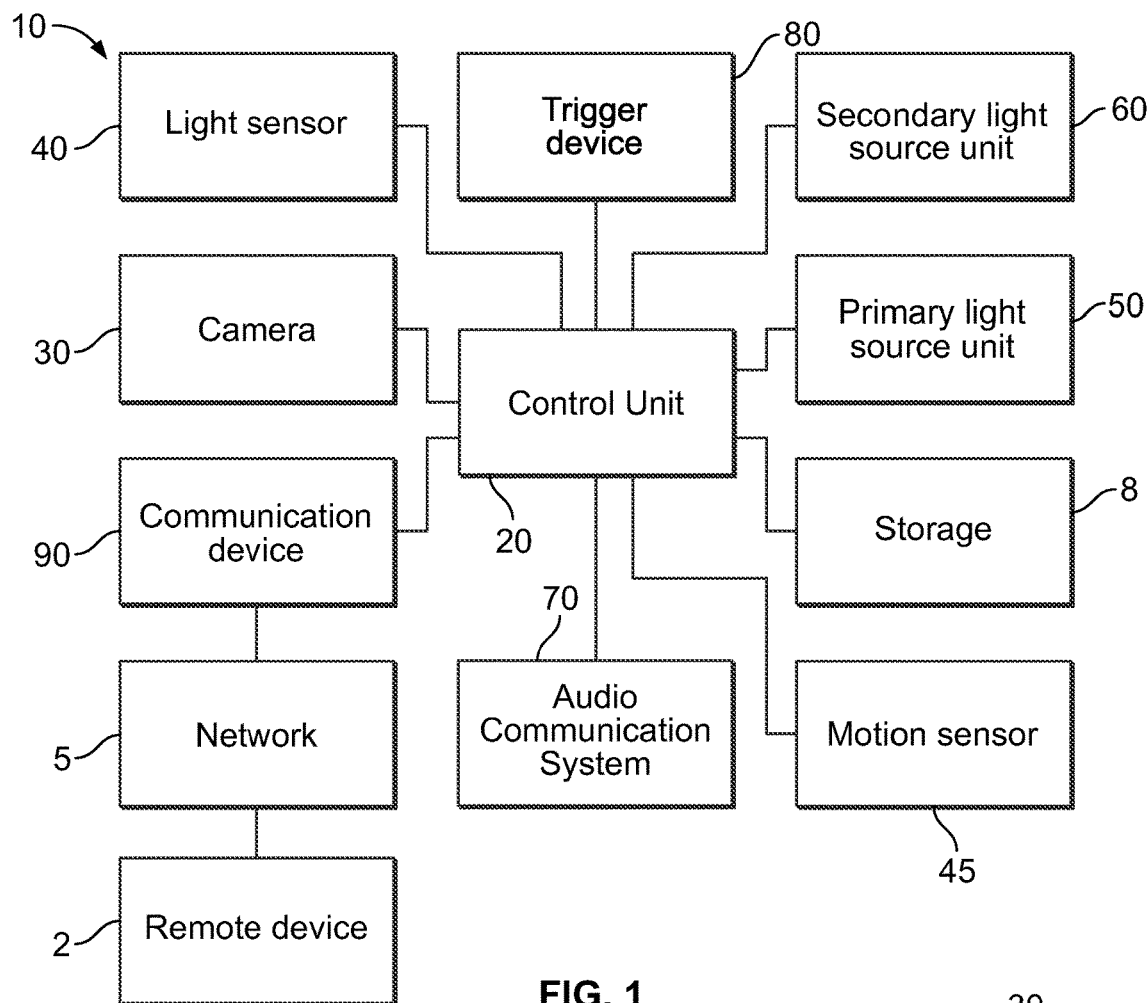
FIG. 1 is a block diagram showing interaction among components of an example of a lighting and notification system described herein.

The present disclosure describes a system that communicates with a user-activated trigger device, such as a doorbell, to determine when it is proper to transmit notifications to a home owner. Certain aspects describe a communication and notification system integrated into a lighting system. FIG. 1 is a block diagram showing interaction among components of an example of a lighting and notification system 10.

Some examples described herein present a lighting and notification system 10 installed at a building entryway. As used throughout this application, the phrase "at an entryway" (e.g., an object mountable "at an entryway" or positioned "at an entryway") refers to components, objects, or systems positioned or arranged to be capable of performing functions with respect to an object in proximity to the entryway. The term does not intend to restrict a spatial positioning of the object. For example, a camera described as positioned "at an entryway" would be positioned so that the camera can capture digital images of an object (e.g., a visitor) within proximity of the entryway (e.g., standing in front of the entryway), even though the camera can be positioned above, to the side of, or even in front of the entryway. Likewise a motion sensor described as positioned or mounted "at an entryway" refers to a motion sensor capable of detecting motion that occurs in the proximity of the entryway, even though the motion sensor itself may be positioned above, in front of, or to the side of an entryway. Moreover, provided that the described apparatus is capable of performing the described functionality with respect to the entryway (e.g., capturing images/video/audio, projecting light, detecting motion, sensing light, etc.), the phrase "at an entryway" should not be considered limited to an particular spatial relationship or within any specific distance of the entryway.

The system 10 includes a control unit 20 (e.g., control circuitry, a control board, an electronic logic board or the like), a primary a light source unit 50, a secondary light source unit 60, a camera 30, a light sensor 40, a motion sensor 45, a two-way audio communication system 70 (e.g., microphone/speaker arrangements), a trigger device 80 (e.g., a doorbell or other sensor detecting a request or attempt to enter or approach an entryway), a communication device 90, and a storage device (e.g., a localized data storage device such as a hard drive, or a remote storage device such as a cloud-based storage system). Through the communication device 90, the system 10 communicates with a network 5, (e.g., the internet), via wired or wireless communication methods. Through the network 5, the control unit 20 and/or the system 10 can interact with a remote communication device 2, such as a smart phone, tablet computer, or other personal computer device. In various implementations, the light sensor may not be included in either the primary light source unit 50 or in any secondary light source unit 60 and be replaced by other systems for detection of ambient light levels, as discussed further herein.

The communication device 90 can facilitate communication with the network 5 and/or the other components of the system 10. For example, the communication device 90 can include a radio transceiver, a Wi-Fi transceiver, a cellular transceiver, or the like, and can be used for locally (e.g., to the system 10 components) and/or remotely (e.g., through the network 5) transmitting and receiving information to various devices. In some examples, the control unit 20 may use the communication device 90 to communicate with the network 5 and the components of the system 10; however, in other examples, the control unit 20 can communicate directly with the components via a direct connection (e.g., a wired connection), without use of the communication device 90. In some aspects, the system 10 may not include a separate communication device, for example, where the control unit 20 includes a communication device or other communication functionality integrated therein.

The network 5 can be any of a variety of networks that facilitate communication between remote devices and systems. For example, the network 5 can be the internet accessed via a wireless router or another network hub. The network 5 can also be a localized network that connects various systems and or components of a home or community. For example, the network 5 may connect a lighting and notification system 10 with other home control systems, such as a lighting control system, an HVAC control system, an appliance control system, a home audio/video control system, a telephone system, a sprinkler system, a garage door monitoring system, a security system, and the like. In some embodiments, the network 5 providing the intra-home connectivity further connects to other networks, for example the internet, via wired or wireless connectivity methods, all of which are known in the art.

Via the network 5, the system 10, and in particular, the control unit 20, can interact with various remote devices 2, such as a smart phone, tablet, personal or laptop computer, or other computing device with an interface capable of communicating with the network 5. In this manner, a user of a remote device 2 can send signals to the system 10, for example, by operating an application on the remote device 2 to interact with the system 10. Through the application, a user may be able to execute functionality, such as controlling the lighting levels of the lighting units 50, turning the camera 30 on or off, adjusting the position and/or orientation of the camera 30, communicating through the two-way audio communication system 70, and authorizing access to a building through a building entryway.

The user may also be able to view digital images (which can include video) captured by the camera 30. In some examples the remote device 2 can access digital images in real-time. For example, a user may be able to view a real-time video feed from the camera through the remote device.

Additionally and/or alternatively, the user may be able to view historically recorded digital images via the remote device 2. For example, the user may be able to access images stored on the storage device 8. In some examples, the images stored on the storage device 8 may be associated with other information, such as the time and date that the image was captured. In this manner a user may be able to view activity that previously occurred, which can be useful, for example, in situations that gave rise to security issues.

In some embodiments the control unit 20 is integrated into the primary light source unit 50. For example, the primary light source unit 50 may have a base portion 54 (see FIG. 3) that includes control circuitry, a communication device 90, and/or other equipment that operate as the control unit 20 to effect operation of the lighting and notification system 10. Alternatively, the control unit 20 can be exterior to the primary light source unit 50, while still in communication therewith, for example, through a wired or wireless connection.

As used throughout this application, the term "effect" should be understood to incorporate either direct or indirect control over a function. For example, where the control unit 20 "effects" operation of the lighting, the control unit 20 can either directly control the lighting via a direct connection to the lighting apparatus, or indirectly control the lighting by sending a signal that causes the apparatus (or an intermediary control apparatus) to adjust its lighting. Moreover, where a control unit "effects" capture of digital images by a camera, the control unit may directly control the camera to capture images (e.g., in examples where the control unit is integrated into a camera), or the control unit may indirectly control the camera 30 by sending an instruction signal that the camera 30 receives and processes to capture an image.

Some examples of the system 10 can include multiple primary light source units 50, multiple secondary light source units 60, and/or additional other light source units. The light source units can operate together so that the operation of one unit depends at least partly on the operation of another. For example, the lights may be configured so that when a primary light source unit 50 turns on or otherwise adjusts, the secondary light source units automatically turn on, or otherwise adjust.

As described throughout this application, the primary light source unit 50 and the secondary light source unit 60 are generally interchangeable in that each light source unit can include some or all of the features of the other. That is, the primary light source unit 50 and the secondary light source unit 60 can comprise the same components, or each may have a different makeup that includes some of the components described herein. For example, as described in more detail below, a primary light source unit 50 may include a camera 30, and a motion sensor 45, whereas the secondary light source unit 60 may include some, none, or all of these components depending on the intended use of each light source unit. The distinction between the primary and secondary light source units (or other light source units) is generally only noteworthy in reference to the operation/interaction/communication between light source units in multiple light source lighting systems. Accordingly, unless the context clearly dictates otherwise, a reference to a general light source unit can refer to a primary light source unit 50, a secondary light source unit 60, or the like.

Figure 2:
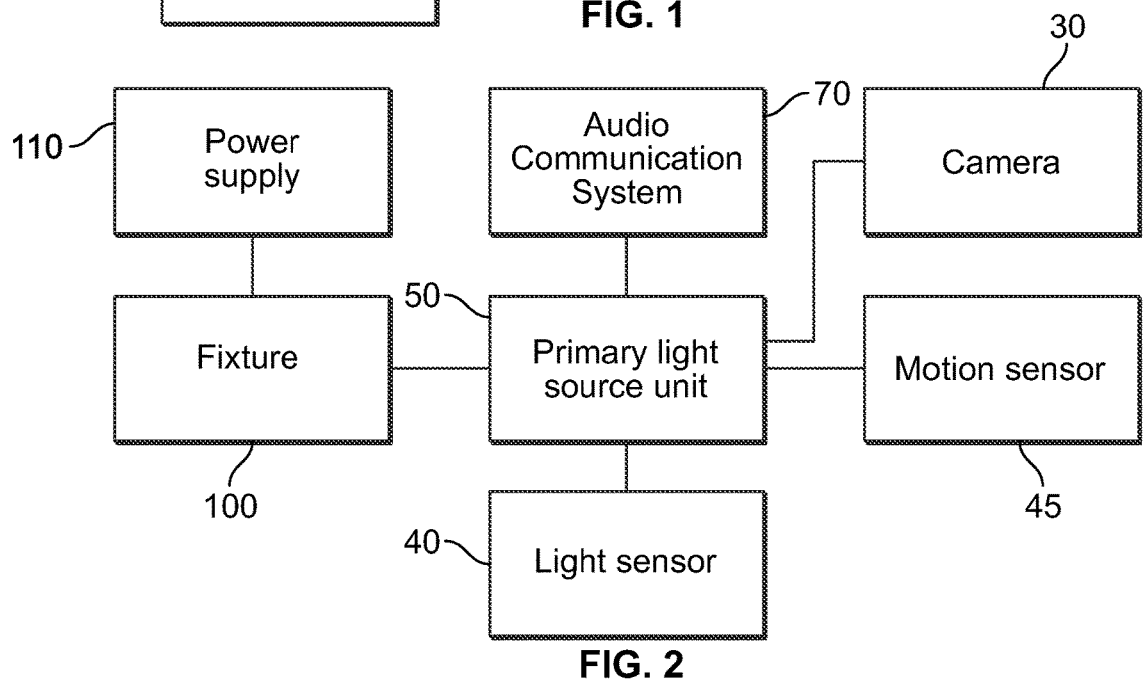
FIG. 2 is a block diagram showing a light source unit interacting with components of an example of a lighting and notification system.

In some examples each light source unit 50 can be integrated with a number of components of the system 10. For example, as shown in FIG. 2, a light source unit 50 can be integrated with a camera 30, a motion sensor 45, and in some examples a light sensor 40.

In some examples, the light source unit 50 can include a base structure 54 that includes all of the components integrated therein. In other examples, the light source unit 50 can be connected to, or connectable to each of these components, for example, via a wired connection. In either example, when a light source 50 is installed into a fixture 100, the power supply 110 of the fixture 100 can provide electrical power to the light source unit 50 itself (e.g., to light a light bulb of the unit), and also to the other components connected and/or connectable to the light source unit 50.

Figure 15:
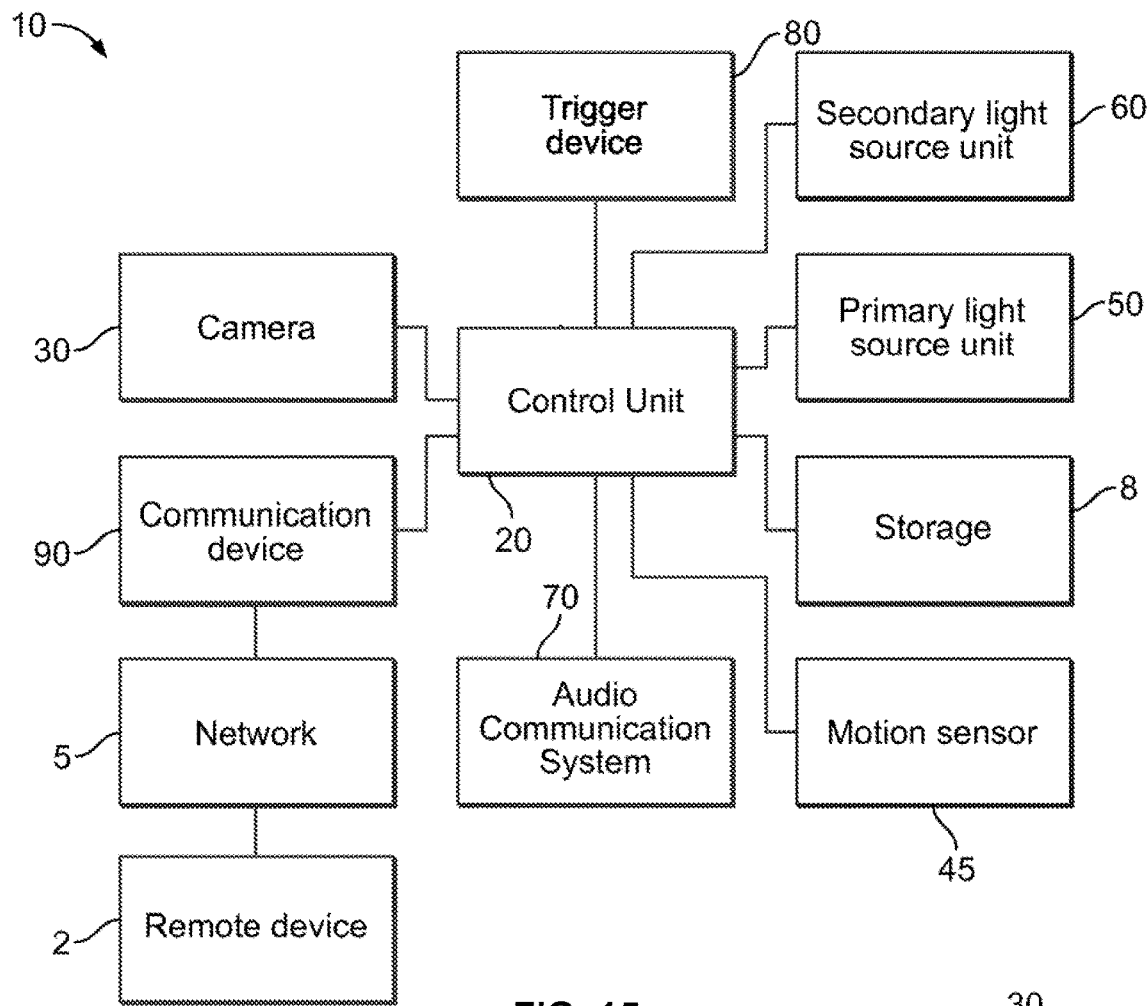
FIG. 15 is a block diagram showing interaction among components of an alternative implementation of a lighting and notification system described herein.
Figure 16:
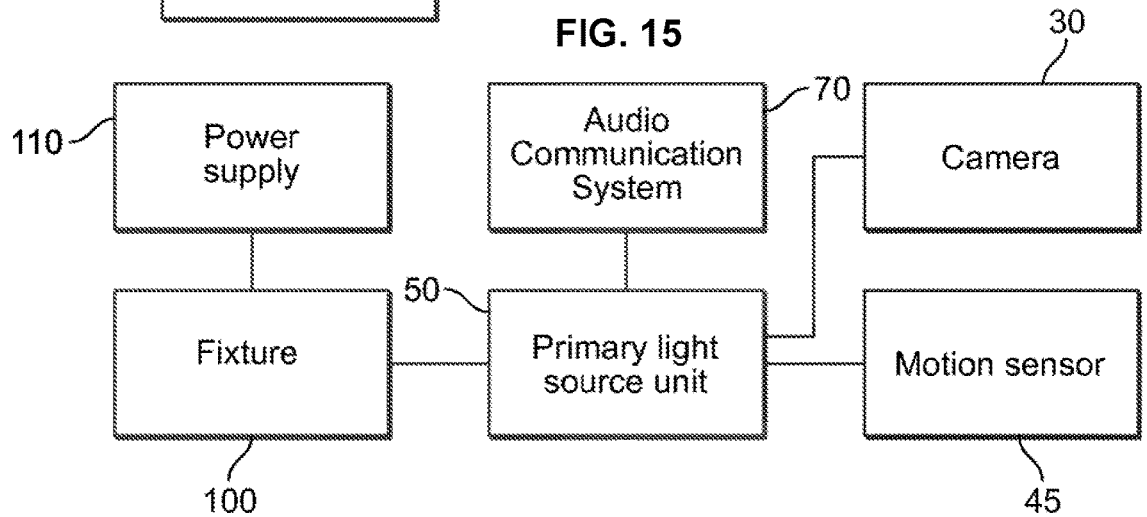
FIG. 16 is a block diagram showing a light source unit interacting with components of an alternative implementation of a lighting and notification system.

In other examples, as depicted in FIG. 15 and FIG. 16, the system 10 and primary light source unit 50 may not include a light sensor 40 to detect ambient lighting levels. In various implementations, light level detection may be implemented through communication device 90 and network 5 obtaining location information for the system 10 and primary and secondary lighting units in order to determine sunset and sunrise information. For example, in implementations, control unit 20 may utilize communication device 90 to access the network 5, which in some implementations may be a local Wi-Fi signal allowing access to the internet. Various known API's may be utilized which provide data to the control unit indicating geographic location which may then be stored in storage 8. In implementations, third party geo-location lookup tools may receive IP addresses and lookup and identify generalized geographic locations associated with the IP address which may be returned via network 5 to the control unit 20.

In some implementations, in place of a light sensor 40/40a in the various light source units, the control unit 20 may utilize the communication device 90 and network 5 to determine on/off times for the first light intensity level of light source 52 and/or in conjunction with the one or more secondary light sources 62. The communication device 90 and the network 5 may include access, through Wi-Fi communication channels and a local network gateway, to the internet. The local Wi-Fi communication channel may include an IP address, such as for example an IPV6 address for the modem and/or local gateway, which is associated with the network, the IP address typically assigned by the internet service provider (ISP). The IP address may be utilized, in various implementations, to determine the geographic region of the system 10 by allowing the control unit to request, through an internet connection pathway, geographic information related to the assigned IP address. For example, in some implementations, the control unit may periodically obtain the current IP address through a standard lookup call to the communication device and network. In some implementations, this periodic verification may be once daily. The control unit may then an API to transmit the IP address to a geo-location lookup tool which provides, in return via the API, geographic coding or related information. For example, in some implementations, the geo-location lookup tool may return geographic location information related to time zone, postal code, latitude and longitude, local phone number prefix, state and/or city location information. Additionally or alternatively, the control unit 20 may obtain a local time based upon user interface and/or the remote device 2 and or from a system call through the communication device and/or network 5. In other implementations, the local time may be uploaded to the system by a remote device. Once stored, the control unit may utilize the storage 8 to maintain local time which could be updated regularly or by the user and/or remote device. In some implementations, local time may be routinely obtained by period system calls instead of maintaining local time on the system 10. Once location information is obtained, in some implementations, the control unit 20 may utilize lookup tables stored in the storage 8 to cross reference geographic identifiers of location with sunrise and sunset times. Alternatively, the geo-location lookup tool API may directly provide sunrise and sunset times or such times may be obtained through other API calls and/or directly in response to receiving the IP address.

For example, in some implementations in systems configured as set forth in variations of FIGS. 15, 16, 17 and 18, the system may determine the IP address for the internet connection on a daily basis. Once the IP address is verified and/or determined, the system may compare the prior returned IP address with the prior determined IP address. If such comparison differs, a call via the API may be made to determine the geolocation of the IP address and then to determine the sunset and sunrise times for the determined geo-location. The system may then store such information in the storage 8. In various examples, API calls may be made to determine geo-location. Additionally or alternatively, API calls may be made to obtain sunrise and sunset times for the obtained geo-location. Such API call may be replaced with an internal lookup table functionality supported by the control unit and information stored in the storage 8.

In various examples, during use, the control unit may determine automated on/off times for the lights source 52 and the various secondary lighting units 62 based upon known and/or determined geographic location, current local time and sunrise and sunset times. In implementations, these off/on times for the light sources may be modified by the user either directly at the system fixture 10 and or via a remote device 2. For example, a user may program automated on times for the various light sources at thirty minutes prior to sunset. Alternatively a user may allow the light sources to turn on at the determined sunset and to automatically turn off at the determined sunrise times. Additionally and or alternatively the user may override any setting via direct control through the remote device 2 and/or cause the system to illuminate before a predetermined amount of time prior to sunset and remain illuminated a predetermined time after sunrise.

Figure 17:
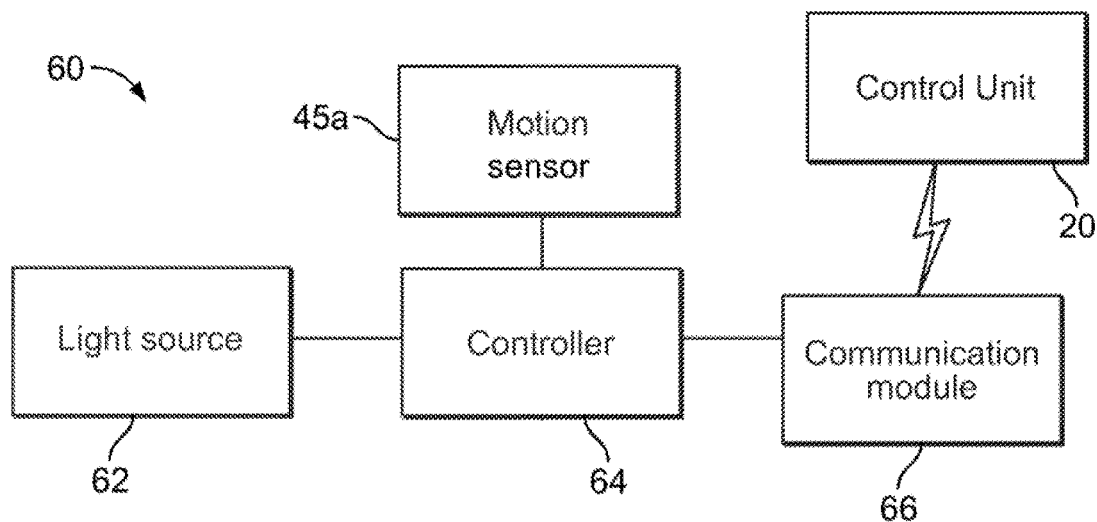
FIG. 17 is a block diagram showing interaction among components of an additional example secondary light source unit used in accordance with various examples of a lighting and notification system described herein.
Figure 18:
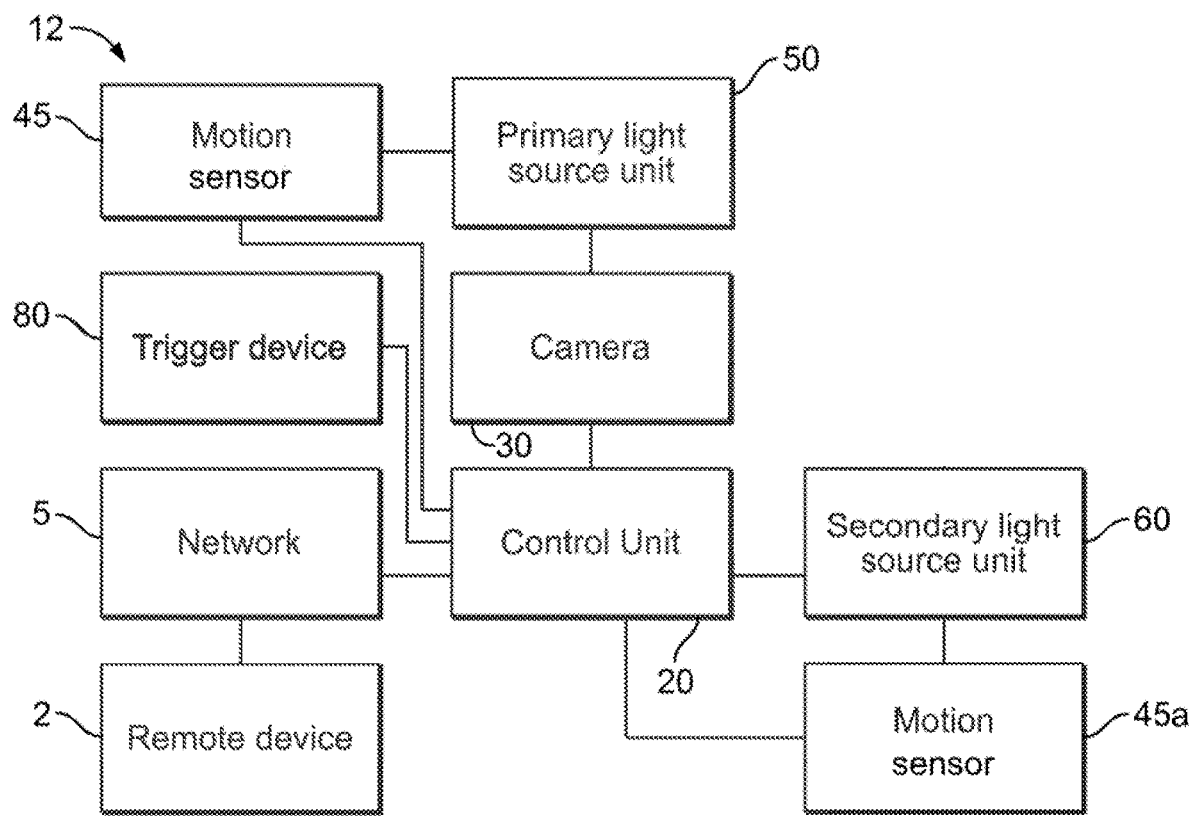
FIG. 18 is a block diagram showing interaction among components of an additional example of a multiple light source unit lighting and notification system described herein.

In various implementations, determined information collected through system calls, API's, determined through lookup tables and the like may be regularly verified and updated in the storage 8. Thus, the system 10 may be able to control the various light sources, cameras, and other system elements based upon current time information including taking into account time change status, movement of the system 10 to another location, or user settings via direct adjustment on the system hardware or through the user remote device 2, such as a smart-phone or similar computing device. In each of the examples, block diagram of FIGS. 15 and 16 are similar to FIGS. 1 and 2 except the light sensor is removed and replaced with the various functionality as described herein. Similarly, bock diagrams represented in FIGS. 17 and 18 are similar to FIGS. 11 and 12 wherein interaction with the light sensor(s) is replaced with the various functionality of the systems and operability of obtaining sunset and sunset times as outlined here outside of utilization of light sensors. Hence, the descriptions of FIGS. 1,2 11, 12 apply equally to FIGS. 15-18 wherein the operability of the light sensor is replaced with determining ambient light levels and/or lighting levels by determining sunset and sunrise times through IP Address geographic lookup functionality and storing such locality based times in the storage.

Figure 3:
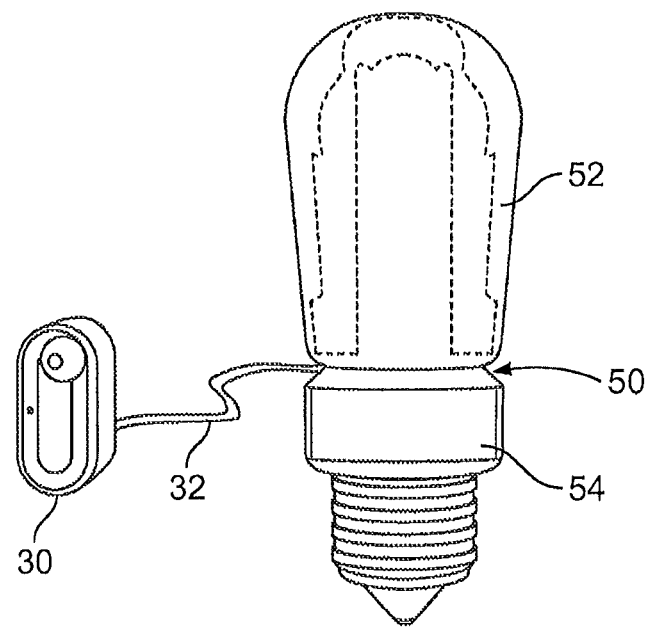
FIG. 3 shows a light source unit with a camera for use with one or more examples of a lighting and notification system described herein.

FIG. 3 shows an example of a light source unit 50 that has a light source 52, (e.g., a light bulb, an LED diode, etc.) and a camera 30 tethered to the light source unit 50 via a wire 32. In some examples the light source unit 50 may include a camera 30 as a component of the unit itself, for example, integrated into the base unit 54, rather than tethered via wire. In other examples, the base unit includes a control unit, and/or a communication device to communicate with other components of the lighting and notification system 10. In still further examples, the light source unit 50 can integrate other components, including for example, a motion sensor, and an audio communication system into the base unit 54.

The light source 52 may utilize technologies such as LED, incandescent, halogen, CFL, or the like. The light source 52 can be configured to illuminate at different light intensity levels. For example, the light bulb may be capable of dimming, or illuminating at a low/medium/high intensity level. In this manner, the light source unit 50 can operate at brighter light intensity levels in certain situations (e.g., when the camera is obtaining digital images), at moderate intensity levels (e.g., to ensure that the motion detector is capable of detecting motion), at lower intensity levels (e.g., to provide track lighting), or at a zero intensity level (i.e., turned off).

The light source 52 can be a light bulb or similar device that is removable/replaceable within the light source unit 50. Alternatively, the light source unit 50 can itself be a complete light unit with a permanent light source 52 incorporated therein.

Some examples of the light source unit 50 are arranged to be able to screw or plug into standard light fixture sockets and can be controlled by various equipment including, for example, a local transmitter, a web based or app based control, a built in motion sensor/detector, and/or a built in light sensor/detector. Additionally and/or alternatively, the light source 52 can be configured to operate at pre-programmed or pre-scheduled times.

Figure 4:
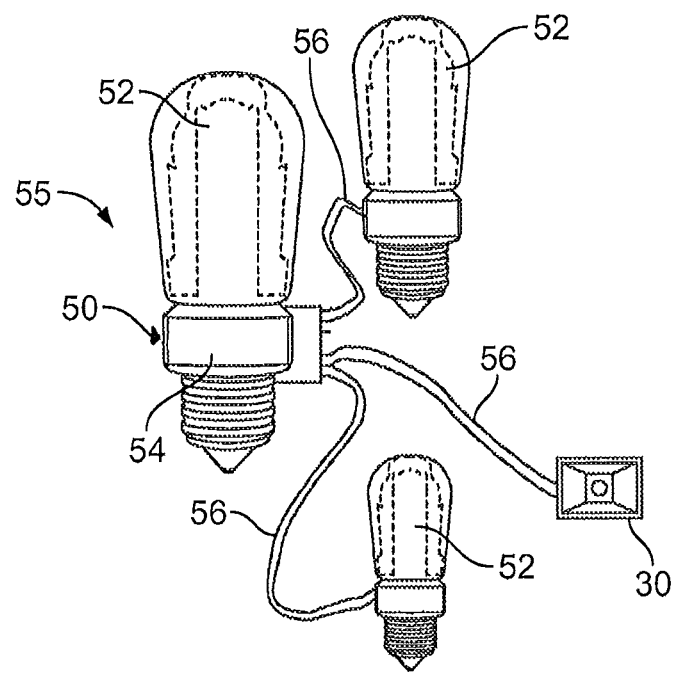
FIG. 4 shows a multi-source lighting in communication with a camera use with one or more examples of a lighting and notification system described herein.

In certain aspects, the light source unit 50 may include multiple light bulbs 52, as shown in FIG. 4. In such an example, multiple bulbs 52 can be used in a single fixture 100. For example, the system 10 can be configured so that the light source unit 50 accommodates additional light bulbs 52 that are powered and controlled by the base unit 54 of the light source unit 50.

The additional bulbs 52 can be tethered to the light source unit 50 by wires 56 that can be connected or disconnected based on the number of additional bulbs 52. The base for the added light bulbs 52 can be constructed, for example, of an insulation material to isolate it from the powered sockets that it is plugged into. In some aspects, the bulbs 52 can be pressed into the screw socket or screwed in and then connected to the primary unit.

Referring again to FIG. 1, the system 10 further includes a camera 30 for capturing digital images. As used herein, the term "digital images" can refer to any type of digital file obtainable by cameras, including but not limited to, still images, video images, audio, and combinations thereof. Digital images can also include other information/metadata associated with the image, such as time stamps (e.g., information identifying the date and time the image was captured), location stamps (e.g., information identifying the particular camera that captured the image and/or the location of the camera), and operation stamps (e.g., information identifying the event that triggered the camera to capture the image).

The camera 30 can be mounted at a building entryway so as to capture images at the building entryway. In some examples, the camera can be mounted at, on, or around a light fixture 100 at the entryway. However, in other examples, the camera may be independently located to obtain images from a desired location or angle.

In some embodiments, the camera 30 is positioned outside of a light fixture and affixed in a location with clear line of sight to an area outside of an entrance to provide a clear image of a person, persons, or vehicles. Other embodiments provide for the camera 30 to be mounted within or integrated into the light fixture 100 while still maintaining adjustability so that the lens can be directed to specific points of interest. The light can be configured to automatically turn on when the ambient light in the area becomes too low as detected by the camera 30 or a light sensor 40 embedded in the device or as determined by sunrise and sunset times as compared to local times and/or adjusted by the user.

The camera 30 can be used as a motion detection system by executing known image analysis techniques to trigger the light to increase in brightness when motion is detected. In some aspects, when motion is detected, the camera 30 will capture a series of images and/or video of the area and store the files in a memory (either locally on a storage device or remotely, e.g., via the internet).

Figure 5:
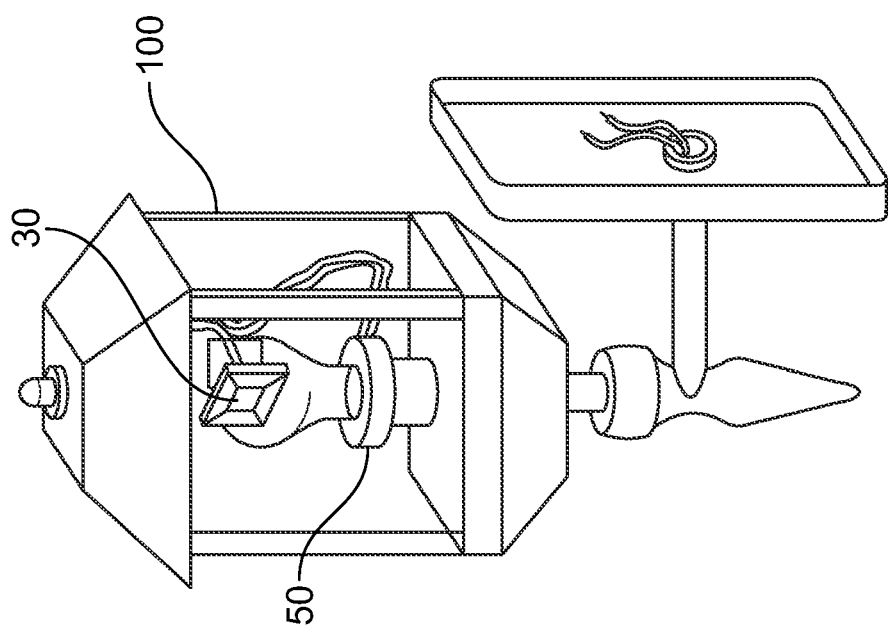
FIG. 5 shows a light fixture with a light source unit with a camera installed therein for use with one or more examples of a lighting and notification system described herein.

In some embodiments, the camera 30 is in electrical communication with the light source unit 50. For example, as shown in FIGS. 3-5, the camera 30 can be tethered to the light source unit 50 via a wire 32 that establishes electrical communication therebetween. Via the wired connection, the light source unit 50 can provide power to the camera 30, and can also control operation of the camera.

Figure 6:
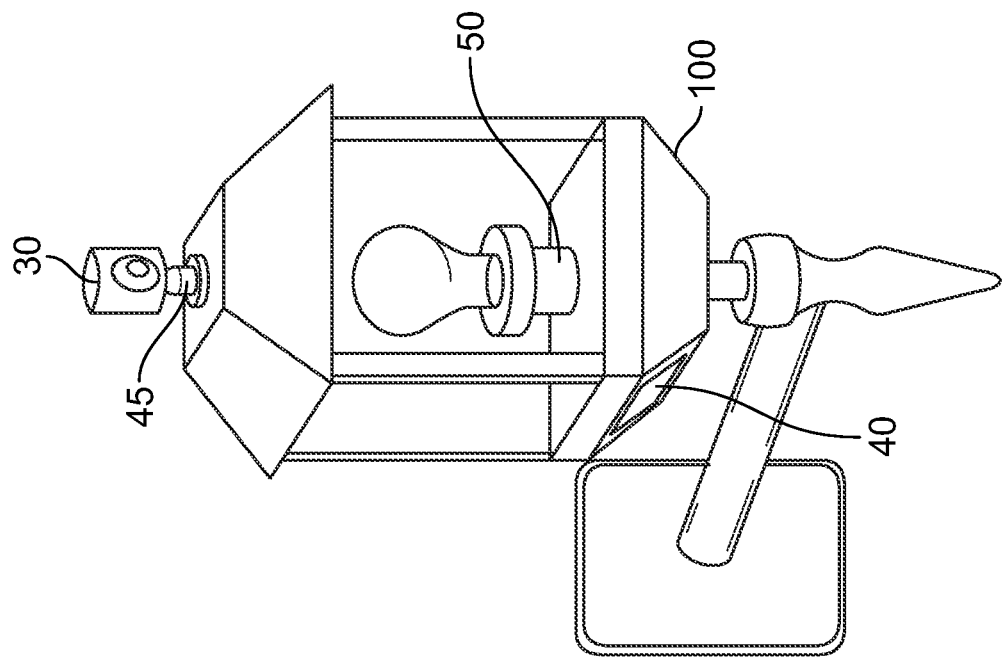
FIG. 6 an example of a light fixture equipped a camera and sensors for use with one or more examples of a notification system described herein.

In other examples, the camera 30 may be indirectly connected to the light source unit. For example, the camera may be able to communicate wirelessly with the light source unit 50 and/or the control unit 20, while connected to a separate power supply. FIG. 6 shows an example of a camera 30 connected to a light fixture 100 as opposed to the light source unit 50. In this manner the electrical power supply of the light fixture 100 can still provide power to the camera, while allowing the light source unit 50 and the camera 30 to be interchanged without affecting the operation of one another. In such examples, the camera can still be in communication with the control unit 20 and/or the light source unit 50 via wireless connection (e.g., via radio signals, Wi-Fi signals, cellular signals, etc.).

The camera 30 can be designed to capture a single or series of still images or full video. The camera 30 can be relatively small and discrete and tethered by wires to a light source unit 50 or a light fixture 100, or be built into the fixture 100 such that the camera lens can be positioned to capture areas of interest.

In some aspects the camera 30 acts as a device to monitor motion and recognize gestures or situations of interest (e.g., as the presence of people, objects or devices). For example, the camera can include, or operate as a motion sensor. In some embodiments, the camera 30 can monitor and/or perform analytics such as facial recognition and the detection of specific vehicles and objects using known techniques.

The camera 30 can use the light generated by the light source unit 50 to operate and perform in low light conditions. In some examples, the camera 30 will sense or determine light levels to determine when and if to turn the light on. Additionally and/or alternatively, the camera 30 will operate in connection with one or more light sensors 40 of the system 10 to detect whether light levels are suitable for capturing digital images.

In some examples the camera 30 will include a microphone and/or a speaker to facilitate real-time two-way conversation between the entryway and a remote device 2 via the network. For example, the camera may include the audio communication system 70 (including a microphone and a speaker) as an integrated component of the camera 30. In other examples, the audio communication system 70 can be a separate component installed at the entryway.

The audio communication system 70 can also be used as an audio sensor to detect sounds or other changes in audio level at the entryway. In this manner the control unit 20 may be able to effect operation in response to the detection of certain sounds or changes in audio. For example, the control unit 20 may be configured to activate a notification in response to the communication system 70 detecting footsteps or voices at the entryway.

Referring again to FIG. 1, some examples of system 10 will include a motion sensor 45. The motion sensor 45 can mount at an entryway so as to detect motion at the entryway. For example, the motion sensor 45 can be installed to detect the presence of a visitor at the entryway.

The motion sensor 45 can operate in connection with the control unit 20 to effect operation of other functionality of the system 10. For example, the system can be configured so that the camera 30 automatically captures images when the motion sensor 45 detects motion at the entryway. In another example, the control unit 20 may be configured to send a notification to a remote device 2 over the network 5 in response to the motion sensor 45 detecting motion at the entryway.

The motion sensor 45 can be a separate individual component. For example, as shown in FIG. 6, the motion sensor 45 can be a separate component mounted on a light fixture 100. Alternatively, the motion sensor 45 may be integrated into another component. For example, the motion sensor 45 can be integrated into the camera 30, the light source unit 50, or the light fixture 100. In some examples the camera 30 may operate as the motion sensor 45.

In other examples, the motion sensor 45 may include a network of multiple motion sensors 45 that operate together so that the control unit 20 can determine whether detected motion is of the type sufficient to warrant activation of system 10 functionality.

The system 10 can also include a light sensor 40. The light sensor 40 can be installed to detect a light level at the entryway. The light sensor 40 can be used to determine whether a lighting level is sufficient for effective operation of various equipment of the system 10. For example, the light sensor 40 can be used to determine whether the lighting level at the entryway is sufficient for the motion sensor 45 to effectively detect motion at the entryway or for the camera 30 to capture digital images. Where detected levels are insufficient, the control unit 20 effects a change in the illumination intensity of one or more light source units 50 of the system 10. Accordingly, in operation, the control unit 20 adjusts the illumination intensity of the light source unit 50 between various levels so that the motion sensor 45 can detect motion around the building entryway when the light intensity around the building entryway is at or above a first light intensity level, and so that the camera 30 can sufficiently capture digital images around the building entryway when the light intensity around the building entryway is at or above a second light intensity level.

In some examples, the light sensor 40 can be an independent component. For example, as shown in FIG. 6, the light sensor 40 can be a separate component installed on a light fixture 100. Alternatively, the light sensor 40 can be incorporated into other components of the system 10, such as the camera 30 or the light source unit 50. In still further examples, the light sensor 40 may include a network of multiple light sensors that operate together to sense a lighting level at one or more locations. In other examples, ambient light levels may be determined without the use of light sensor 40 wherein the system may determine sunrise and sunset times and therefore corresponding ambient light levels independent and exclusive of utilization of light sensors.

As shown in FIG. 1, the system 10 can also include a trigger device 80. The trigger device 80 is mountable at the building entryway and can be used to detect an event of interest at the entryway. For example, the trigger device 80 can include a doorbell interface (e.g., a button) that operates similar to a standard doorbell.

Additionally and/or alternatively, the trigger device 80 can include one or more sensors configured to detect the presence of a visitor at the entryway, or more particularly, a desire of a visitor to have access to the building. For example, the trigger device 80 can include a visitor interface panel, a tilt sensor, an open door sensor, a forced entry sensor, an object detection sensor, and/or an audio detection sensor.

The trigger device 80 can serve multiple functions. For example, the trigger device 80 can be used to send a signal to a doorbell or door chime within the building in a manner similar to that of a typical doorbell. The trigger device 80 can also be used to send a trigger signal to the control unit 20. For example, when a visitor or visitors at the entryway activate a switch on a trigger device 80 at the entrance, trigger device can send a signal to the system (or the control unit) that the trigger device has been activated.

In some examples, the trigger device 80 can include a doorbell activation interface (e.g., a button) and a corresponding door chime unit installed in a building. When the activation interface is activated (e.g., the button is pushed), a signal is sent to the door chime unit, which responds by initiating a door chime audio sequence. Either the door chime unit, the doorbell activation interface, or both can be configured to transmit the trigger signal to the system 10 or control unit 20.

In response to receiving the trigger signal, the control unit 20 can effect certain functionality. For example, in response to receiving a trigger signal, the control unit 20 may perform one or more of the following: sending a notification to a remote device 2 over the network, activating the camera 30 to capture digital images, adjusting the light intensity level of one or more light source units 50 of the system, initiating two-way communication via the audio communication system 70, and/or enabling a real-time live feed from the camera 30 to a remote device 2 over the network 5.

In some examples, in response to receiving a trigger signal, a control unit 20 may activate the camera to capture digital images (e.g., capture images of a visitor activating the trigger device 80), and then transmit a notification signal to the remote device 2 that includes one or more of the images captured by the camera 30. In this manner an absent homeowner can be apprised when visitors arrive at their home and via the transmitted images can view the entryway and/or the visitor.

In response to receiving the notification, the user can access an interface on the remote device 2 that can facilitate other functionality. For example, the user may be able to access a live video stream at the entryway, viewing images in real time captured by the camera 30. The user may be able to initiate two-way communication between the entryway and the remote device using the audio communication system 70. Further, in some aspects, the user may be able to grant or deny access to the building through the entryway with the remote device 2. For example, the remote device 2 may access an interface that allows a user to unlock a door if the visitor is someone the user trusts with building access.

The notification feature can aid in the user in making a decision regarding the next steps to take. For example, if the visitor is a parcel delivery person, the homeowner may initiate a two-way audio communication and instruct the parcel delivery person to leave the parcel in a hidden area.

In another situation, if the visitor is a person that the homeowner is familiar with (e.g., a friend or family member), the homeowner may activate unlock features so that the visitor can access the building. In other situations, the homeowner may elect to ignore the notification if the visitor is unknown or of no interest (e.g., a solicitor). And in still further situations, the notification may present a security issue, allowing the homeowner to act accordingly. For example, where the notification is activated by a forced entry sensor (e.g., a sensor that detects an attempted forced entry into the home), the homeowner may initiate a conversation to thwart the forced entry attempt. The homeowner may also contact a security authority (e.g., a police station or an alarm company), either by phoning the authority or via an emergency feature on an interface on the remote device 2.

FIGS. 5 and 6 show examples of a light source unit 50 installed in a light fixture 100 that may be mounted at a building entryway. The light fixture 100 can be hard wired to a building electrical power supply, for example, the building's A/C power source. This electrical power supply can thus supply power to a light source unit 50 installed in the fixture 100, as demonstrated in FIG. 2. The electrical power supply can also provide power to the other components of the system 10, either directly, via hard wired connections through the fixture 100 or another power outlet, or through the light source unit 50. For example, where multiple components are integrated or tethered into the light source unit 50, the installed light source unit 50 distributes electrical power from the building power supply to those components.

In FIG. 5, the light source unit 50 with a tethered camera 30 is installed in the light fixture 100. The camera 30 is attached to a surface/pane on the light fixture 100. In FIG. 6, the camera 30 is mounted to the top of the light fixture 100. In this manner, the camera may be hard wired to the light fixture so that the light source unit 50 is physically independent of the camera 30. That is, in this example, the light source unit 50 may be able to be uninstalled from the light fixture 50 without necessitating removal of the camera 30.

The light fixture 100 of FIG. 6 also includes other components of the system 10 integrated into the fixture 100. For example, the fixture 100 may include a light sensor 40, which can be used to detect a lighting level at the entryway. The fixture 100 also includes a motion sensor 45 positioned near the camera. This motion sensor 45 can be used to detect motion at the entryway. When motion is detected, the control unit 20 can activate the camera 30.

In some examples, a communication system (e.g., a microphone and speaker) will be integrated into the fixture 100 to facilitate two-way communication between the entryway and a remote device 2. In other examples, the communication system may also be integrated into the camera 30 and/or the light source unit 50. In still further examples, the communication system can be installed in another location at the entryway, such as in a secondary light fixture, a trigger device, or in an intercom system.

Power for the system 10 can be supplied by a light fixture 100 into which a light source unit 50 is installed. In some aspects, the system 10 can include multiple light fixtures connected to the same power switch. In this manner, a separate light can be supplied with a radio receiver and a light control system (e.g., on/off, bright/dim controls). The light control system can be controlled by a wireless signal from the light source unit 50, camera 30, or control unit 20 of the presently disclosed system. This can provide for multiple lights to turn on or off at the same time, and increase or decrease intensity the same amount based on events detected or signaled to the system.

In some situations it can be useful to have power supplied to the fixture at all times. To facilitate this constant supply of power, some exemplary systems include a wireless light control switch, or a switch cover, which can include a transmitter or transceiver, and be configured to cover and block typical access to standard wall switches.

Figure 8:
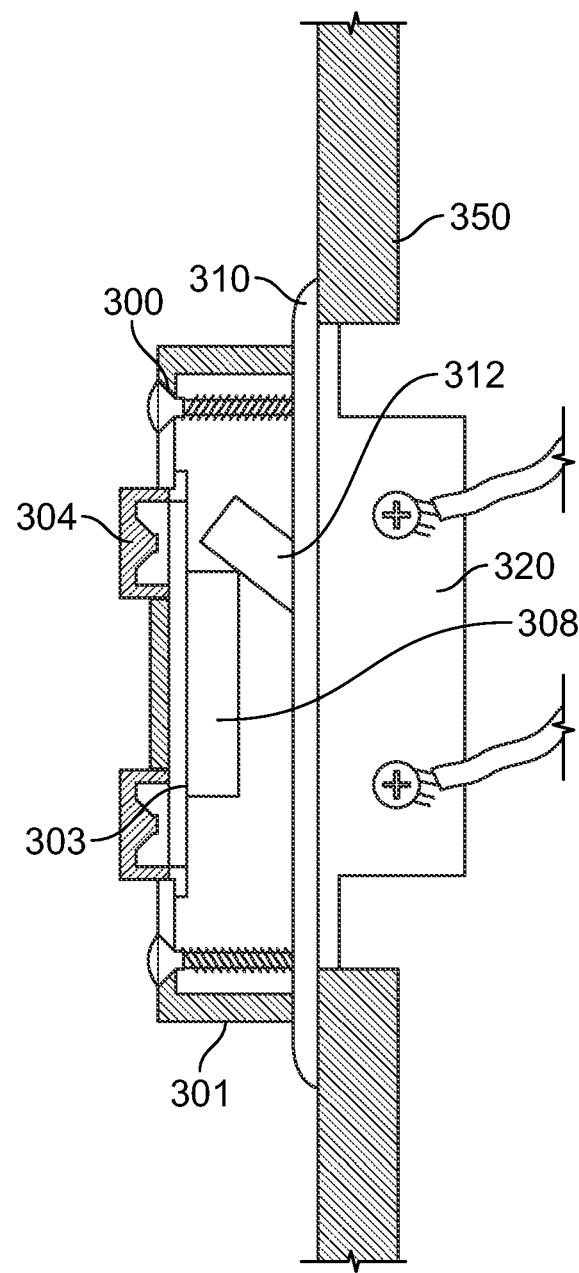
FIG. 8 is a side cross-sectional view of the wireless control switch of FIG. 7A installed over a light switch.

FIGS. 7A-B and 8 demonstrate examples of such a wireless light control switch 300. The wireless light control switch 300 can be used to prevent accidental disconnection of power from a light fixture 100 that has a light source unit 50 installed therein.

The wall switch 312 can be moved to the "on" position and then the device can be installed over the wall switch, typically using existing mounting locations on the switch plate 310. Buttons (e.g., on/off buttons 304) and/or switches on the switch cover can be added to control lighting functions such as on/off, brightness, and duration of time on. This allows a user to manually turn on/off a light source unit installed in a light fixture without cutting off all power to the fixture—which might occur, for example, if the switch 312 were moved to an "off" position. Because the wireless control switch 300 controls electrical power only to the light source/bulb 52 and not to the entire fixture, the other components installed in the light fixture can continue to receive electrical power and continue to operate. For example, the light sensor 40, the motion sensor 45, the camera 30, the audio communication system 70, and the control unit 20 can continue to operate properly even when the light of the light source 52 is turned off, because the switch for that fixture can remain on.

FIG. 7A shows a wireless control switch 300 as it is installed on a switch plate 310. The wireless control switch 300 can be installed into the existing switch plate 310 of a wall via screws 325 configured to align with holes on the plate 310. A switch cover 302 can then be snapped onto the control switch 300 to cover the screws and provide a more aesthetically pleasing appearance, as shown in FIG. 7B. In another approach, the switch cover 302 can mount using magnets that secure the cover 302 to the screws of the originally installed light switch 310. In other approaches, other mounting techniques can use adhesives, hook and loop fasteners, hooks, clips, or the like.

The wireless light control switch 300 has an interface that allows a user to control the electrical power supply to a light source unit installed in the fixture via buttons 304. The interface can include on/off buttons as shown in FIGS. 7A-B, but can also include features to control other functionality, such as light dimming, light color change, or control of a preprogrammed lighting timer. In some embodiments, the wireless control switch 300 can be configured to control other components of the system 10, such as the camera 30, or the audio communication system 70.

Once installed, the light control switch 300 controls a light level of an installed light source unit 50 without disrupting the electrical power supply to other equipment, such as the motion sensor or the camera. Because the wireless light control switch 300 mounts directly over an existing light switch 312, it inhibits toggling (e.g., unwanted or accidental toggling) of the existing light switch by blocking user access to that switch 312.

FIG. 8 is a side cross-sectional view of an installed wireless control switch 300. The wireless control switch 300 is mounted over an existing switch 312 that is toggled in an "on" position, thereby allowing power to be supplied to the light fixture with which it is associated. The light switch 312 is positioned within a mounting plate 310 installed within a wall 350 of a home. The light switch 312 is attached to a switch box 320 that is connected to the home A/C power supply. The wireless control switch 300 includes a battery unit 308, which includes replaceable batteries (e.g., standard AA, AAA, C, D or 9V batteries), or it can be a rechargeable battery unit. In some embodiments, the wireless light switch 300 can be configured to electrically connect with the switch box 320 so as to tap into the home A/C power supply. In still further embodiments, the battery unit 308 receives charge from the home A/C power supply so that the battery can serve as a backup power supply in the event of a home power outage.

The wireless control switch 300 includes interface buttons 304 (e.g., on/off buttons, dimming buttons, or other control buttons). The buttons 304 can be mechanical buttons that depress to operate, or they can be capacitive touch buttons that operate when touched by a user.

A wireless transmitter 303 communicates wirelessly with an associated light source unit 50. Thus, when buttons 304 on the wireless control switch are pressed, the wireless transmitter 303 transmits instructions that effect operation of the light source unit 50. A cover 301 or housing surrounds the wireless control switch 300 and the internal electronic components. In some examples, the wireless transmitter 303 is configured to communicate with various other devices or components, for example, a control unit or a network.

Some examples described herein also integrate multiple light source units so that they communicate with one another. For example, certain examples employ a primary light source unit that incorporates features or otherwise interacts with a camera, a trigger device, and sensors, and with one or more secondary light sources. The secondary light source units communicate with the primary light source, either directly or through a control unit, so that the light intensity of the secondary light source units adjusts based on communications or associations with the primary light source unit.

Figure 9:
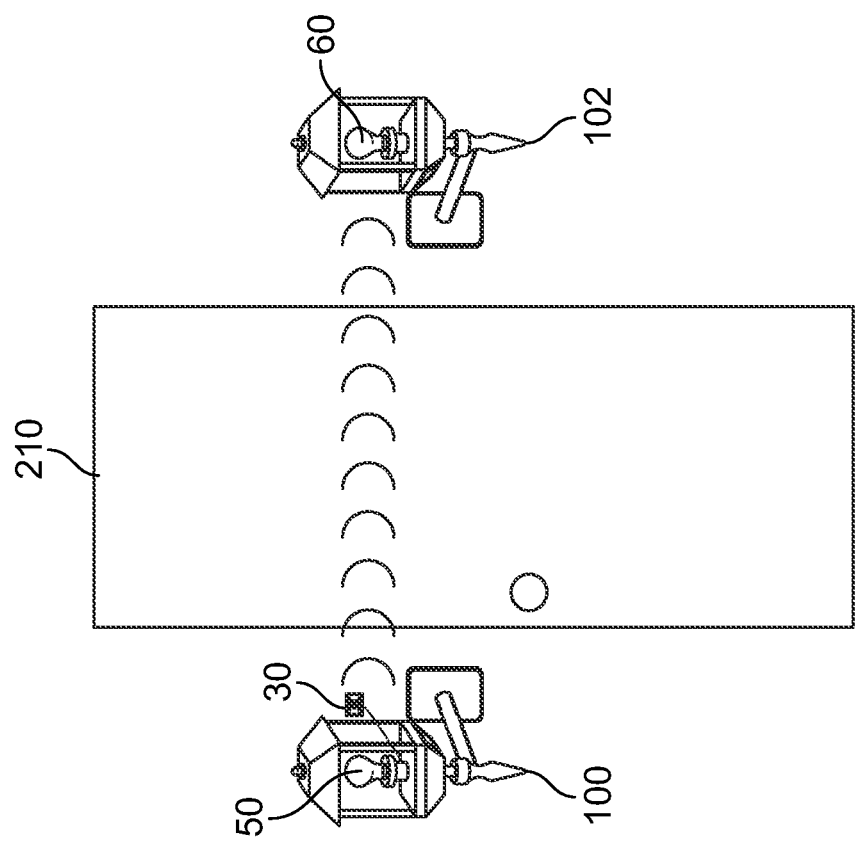
FIG. 9 shows an example of a multiple light source lighting and notification system installed at a building entryway.

FIG. 9 shows a primary light source unit 50 is installed in a fixture 100 on a left side of the building entryway. The primary light source unit 50 includes a camera 30, which can perform any of the features of the cameras described herein. Though not shown in FIG. 9, the primary light source unit 50 can also incorporate other components such as motion and light sensors, an audio communication system, and a control unit.

A secondary light source unit 60 is installed in another fixture 102 to the right of the entryway 210. The primary light source unit 50 communicates wirelessly with the secondary light source unit 60 so that a control unit (e.g., a control unit of the primary light source unit 50) can control the lighting features and other functionality of the secondary light source. For example, the secondary light source unit 60 can be configured to adjust in light intensity (e.g., turn on/off, brighten, dim, etc.) when the primary light source unit 50 similarly adjusts in light intensity.

Additionally and/or alternatively, the secondary light source unit 60 can be configured to adjust in response to the control unit and/or the primary light source unit 50 performing certain functionality or communicates certain information. For example, the secondary light source unit 60 can adjust when the primary light source unit 50 (or other components of a system associated with the primary light source) captures digital images, detects certain events (e.g., detects motion or a change in lighting levels at the entryway), and/or receives certain communications (e.g., receives a signal from a trigger device).

Figure 10:
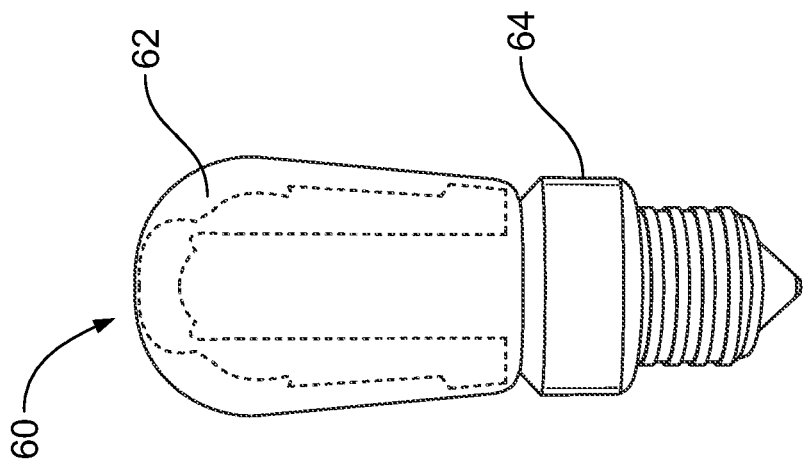
FIG. 10 is a close up view of a secondary light source unit of the multiple light source lighting and notification system of FIG. 9.

FIG. 10 is a close up view of a secondary light source unit 60 of the multiple light source lighting and notification system of FIG. 9. As shown the secondary light source unit 60 includes a controller 64 and a light source 62 (e.g., a light bulb). In some examples, the controller 64 of the secondary light source unit 60 can perform some or all of the functionality of the primary light source 50 and therefore include similar associated structure as that of the control unit including associated communications module and required light drivers for controlling the light source 62

Figure 11:
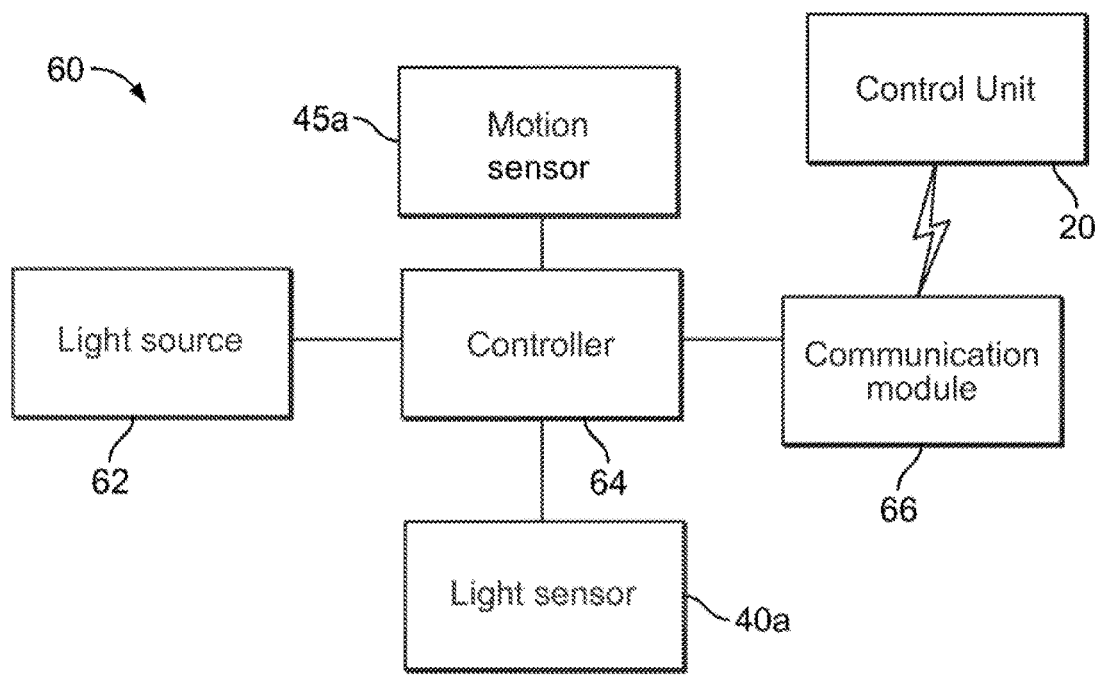
FIG. 11 is a block diagram showing interaction among components of an example secondary light source unit used in accordance with examples of a lighting and notification system described herein.

FIG. 11 is a block diagram showing interaction among components of an example secondary light source unit 60. The controller 64 interacts with the light source and a communication module 66, which can include a wireless radio or Wi-Fi transceiver. In this manner, via the communication module 66, the secondary light source unit 60 can communicate with the primary light source unit 50 and/or a control unit 20 of a lighting system. Thus, the control unit 20 and/or the primary light source unit 50 can control the functionality and operation of the secondary light source unit 60 in at least some situations.

In some examples, the secondary light source unit 60 can also include, or be in communication with, a motion sensor 45a and a light sensor 40a. In some embodiments, the motion sensor 45a and light sensor 40a can include the same sensors that are a part of, or in communication with, the primary light source unit 50. In other embodiments, the sensors of the secondary light source unit 60 are independent of those of the primary light source unit 50.

The controller 64 effects adjustment the light intensity level of the secondary light source 62. The controller can be configured to adjust the light intensity level in response to a number of different events. For example, the controller 64 may adjust the secondary light source 62 in response to the communication module 66 receiving an instruction signal from the control unit 20 of a lighting system and/or a primary light source unit 50. Such an instruction signal may be sent in response to a detected increase in light intensity of the primary light source unit 50. In response to such an event, the controller 64 may increase, decrease, turn on, or turn off the light source 62 of the secondary light source unit 60.

In some examples, the controller 64 may receive an instruction signal sent in response to the detection of motion within a lighting region of the lighting system. For example, the control unit 20 may send an instruction signal when a light sensor affiliated with the lighting system (e.g., motion sensor 45 or 45a, or another motion sensor) detects motion within a particular location. The location can be a lighting region that is intended to be lit by the primary light source unit 50, the secondary light source unit 60, another light source unit, or a combination thereof (e.g., the various light sources overlap to illuminate a lighting area). In this manner, when motion is detected in this region, lights directed to illuminate that region may turn on and/or increase in intensity. This can add a level of security in the region so as to illuminate trespassers or to assist visitors with visibility as they walk through the region.

In some examples, the instruction signal is sent in response to a remote device sending a signal to the lighting system via a network to adjust the intensity of the light source. For example, a control unit 20 can be configured to send a signal to a secondary light source unit 60 when a user operating a remote device in communication with the control unit 20 over a network transmits a signal intended to adjust a lighting level of one or more light source units of the lighting system.

In still further examples, the controller 64 can be configured to adjust the lighting level in response to a light sensor (e.g., the light sensor 40a affiliated with the secondary light source unit 60 or another sensor affiliated with the lighting system) detecting an increase in a lighting level. The controller 64 can be configured to adjust the lighting level automatically, without receiving an instruction from a separate control unit 20, or it can be configured to adjust the lighting level only in response to receiving such a signal. In this manner, a secondary light source unit 60 can be configured to adjust (e.g., turn on/off, brighten or dim) automatically whenever a primary light source unit 50 or any other light source of the lighting system adjusts. The light sensor 40a can be directed to a particular lighting region (e.g., a region at an entryway or along a pathway to an entryway) so that the light intensity level of the secondary light source unit 60 is dependent upon the light level in that particular lighting region. In some examples, this lighting region will be a lighting region illuminated by a separate light source, for example the primary light source unit 50. In such an example, the light intensity the secondary light source unit 60 will adjust when the light intensity of the primary light source unit 50 adjusts.

In other examples, the controller 64 may adjust light levels in response to determination of ambient light levels as outlined herein. In implementations, the ambient light levels affiliated at the secondary light source may be determined independently of the same determination of ambient light levels at the primary light source. In some examples, the primary light source may transmit determined sunset and sunrise information to the secondary light source. In other implementations, the secondary light source may utilized such information to independently control the secondary light unit illumination levels. Additionally or alternatively, operation of the secondary light unit may be similar to operation with the light sensor 40a wherein detecting ambient light levels may be determined based on such information instead of sampled via a sensor 40a.

Some example lighting systems may include a plurality of secondary light source units 60 (or tertiary light source units, etc.) that operate together in connection with a primary light source unit 50 and/or a control unit 20. In this manner, the system may provide lighting to a variety of different lighting areas at a location, such as around a building, inside a building, around a yard or parking lot, etc. The control unit 20 can be configured to direct certain light source units to turn on in response to certain events that are detected or controlled with respect to other light source units. For example, a control unit 20 can be configured to adjust the lighting levels (or control other functionality) of one, some, or all light sources of a lighting system in response to certain events.

In some examples, a lighting system will comprise one primary light source located at a building entryway, and a plurality of secondary light sources located in various locations near and around the building. The light sources can all be arranged so that each light source directs at least some light to a lighting region that is not illuminated by another light source.

The control unit can be configured to illuminate certain secondary light source units in response to certain events, and can also be configured to illuminate all light source units in response to other events. For example, when the system (via a sensor) detects motion in one particular lighting region, the control unit can be configured to adjust (e.g., turn on/off, brighten, dim, etc.) the light source unit (or units) arranged to illuminate that particular lighting region. In another example, the light source unit can be configured to adjust all the light sources in the system when the system detects motion at the building entryway.

Figure 12:
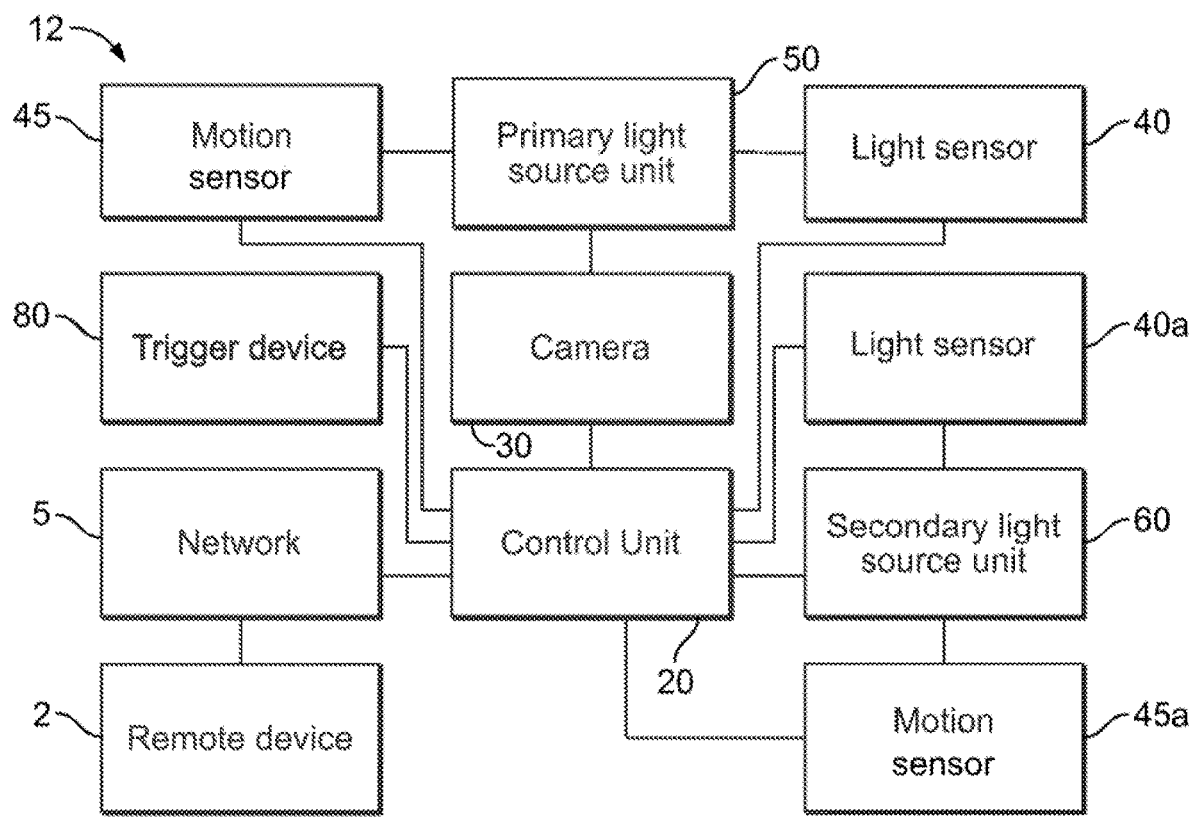
FIG. 12 is a block diagram showing interaction among components of an example of a multiple light source unit lighting and notification system described herein.

FIG. 12 is a block diagram showing interaction between components of an example of a multiple light source unit lighting and notification system 12 (i.e., a multi-light system) described herein. The multi-light system 12 includes a control unit 20, a primary light source unit 50, a secondary light source unit 60, and a trigger device 80. Although only one primary light source unit 50 and one secondary light source unit 60 are shown in FIG. 12, some example multi-light systems 12 will include a plurality of primary 50 and/or secondary 60 light source units. Though not shown in FIG. 12, some exemplary multi-light systems 12 will also include other features described herein, including a communication system affiliated with one or more of the light source units, trigger devices, wireless control switches, etc.

The control unit 20 can be incorporated into the primary light source 50 (e.g., located within a base portion of the light source unit), the secondary light source unit 60, or it can be located in a separate location independent of light sources. The control unit 20 communicates with a remote device 2 over a network 5 in a manner similar to that disclosed with respect to other embodiments described herein.

The primary light source unit 50 can be any of the light source units described herein and can include any of the features and associated therewith. For example, the primary light source unit 50 can be any primary light source unit 50 shown and described with respect to FIGS. 1-6. The primary light source unit 50 can include a motion sensor 45, a light sensor 40, a camera 30, an audio communication system (not shown in FIG. 12), or other components. The camera, sensors, and/or components communicate with the control unit 20 either directly (e.g., via a wired or wireless connection), or indirectly through the primary light source unit. In some examples, the camera 30, sensors 40 and 45, and other components can be integrated into the primary light source unit 50, but in other aspects some or all of the components may be separate from the primary light source unit, provided that the components are in communication with the control unit 20.

The multi-light system 12 also has a secondary light source unit 60, which can also be any of the light source units described herein. Like the primary light source unit 50, the secondary light source unit 60 can include or connect to a variety of components including a light sensor 40*a* and a motion sensor 45*a*. In some examples the secondary light source unit 60 will include fewer components than the primary light source unit 50 for purposes of cost and efficiency. For example, the multi-light system 12 may employ several secondary light source units 60 along a pathway that leads to a building entryway where a primary light source unit 50 will be installed with a camera. In such a situation, the system 12 may employ a more practical secondary light source unit 60 with a more limited array of features (e.g., the units may not include a camera or communication system).

The control unit 20 is configured to effect adjustment of various features of the system 12. For example, the control unit 20 may control the light intensity levels of the primary 50 and secondary 60 light source units. The control unit 20 may be able to adjust the light intensity among an array of levels, for example, by adjusting between a low, medium, and high light settings or by adjusting light intensity via a light dimming feature.

In some embodiments, the control unit 20 effects adjustment of the light intensity level of the primary light source unit 50 (or other light source units) in response to a light sensor 40 detecting a lighting level below a predetermined threshold. For example, the control unit 20 can be configured to adjust the light intensity level of a light source unit directed to a particular lighting area, where light sensors of the multi-light system 12 determine that the light level in that particular lighting area is too low for the motion sensor 45 to operate effectively.

In other embodiments, the control unit 20 is configured to effect capture of digital images by the camera 30 in response to certain events. For example, the control unit 20 can effect capture of digital images when the motion sensor detects motion around a lighting area lit by the primary light source unit. Additionally and/or alternatively, the control unit 20 can automatically effect the capture of digital images when it effects the adjustment of the light intensity one or more of the light source units of the multi-light system 12.

In some multi-light systems 12, the control unit 20 will be configured to effect transmission of a notification signal via a network 5 in response to a trigger event. For example, when the trigger device 80 transmits a trigger signal (e.g., in response to a visitor pressing a doorbell button), the control unit will send a notification signal to a remote device 2 via a network.

The control units 20 described in the examples presented herein can be designed to incorporate broad functionality. For example, the control unit 20 can be capable of collecting and processing images from the camera 30, controlling lighting of the light source units 50, reacting to events such as ambient light levels, motion or information transmitted to the device, communicating with other wireless devices, sending and receiving information via the internet, and/or extending the range of wireless networks such as Wi-Fi and others.

The control unit 20 (alone or in connection with a communication device 90) can include one or more radios configured to operate with various networks at a variety of communications frequencies and be able to communicate with multiple devices on any given network or multiple networks. The control unit 20 can act as a transceiver to send and/or receive information to and/or from stand alone or networked products such as, garage door openers, wireless controlled lights, doorbells, moisture detection systems, door/window sensors, security systems, sound detection systems, other cameras not incorporated into this device, wireless switch controls, smart phones, tablets, PCs, and other devices.

In some aspects the control unit 20 is configured to send notification signals to the remote device 2 over the network 5 in response to certain events. For example, the control unit may send notifications to the remote device in response to the system 10 detecting the presence of a visitor at a doorway. This can be detected, for example, by detecting a visitor ringing a doorbell (e.g., activating a doorbell activation interface), by detecting motion at an entryway, by detecting a change in a lighting level at the entryway, by detecting a change in audio levels at the entryway (e.g., using the audio communication system 70), or combinations thereof.

In some examples, the control unit 20 is configured to adjust the lighting of one or more light source units 50 of the system 10 in response to certain events. For example, the control unit 20 can adjust the lighting of a light source unit 50 when a lighting level at an entryway is below a threshold predetermined to be sufficient for a motion sensor to effectively detect motion.

In another example, the control unit 20 can adjust the lighting of a light source unit 50 when the motion sensor 45 detects motion at the entryway. In such a situation, the control unit 20 may adjust the light level of the light source unit 50 to a level predetermined to provide effective illumination to operate the camera. In situations where the light sensors detect sufficient light, (e.g., during daylight hours), the control unit 20 can be configured not to turn on or change the light level of the light source unit 50.

In other aspects, the control unit 20 can be configured to automatically adjust lighting levels in response to the control unit 20 effecting other actions. For example, the control unit can be configured to automatically activate the camera 30 to capture one or more digital images each time the control unit 20 effects adjustment of the lighting level of one or more light source units 50.

In some examples, the control unit 20 is configured to adjust the light intensity level of one light source unit (e.g., a secondary light source unit 60), in response to the adjustment of another light source unit (e.g., a primary light source unit 50).

Some embodiments of the presently described technology relate to a notification system that employs features that can be used in multiple locations throughout a home. For example, a notification system can employ security features (e.g., smoke and CO detectors, burglar alarms), lighting features, utility features (e.g., control of HVAC, electrical features), and movable equipment features (e.g., movable barrier/garage door operators) into a single system that communicates locally and remotely with a network.

Figure 13:
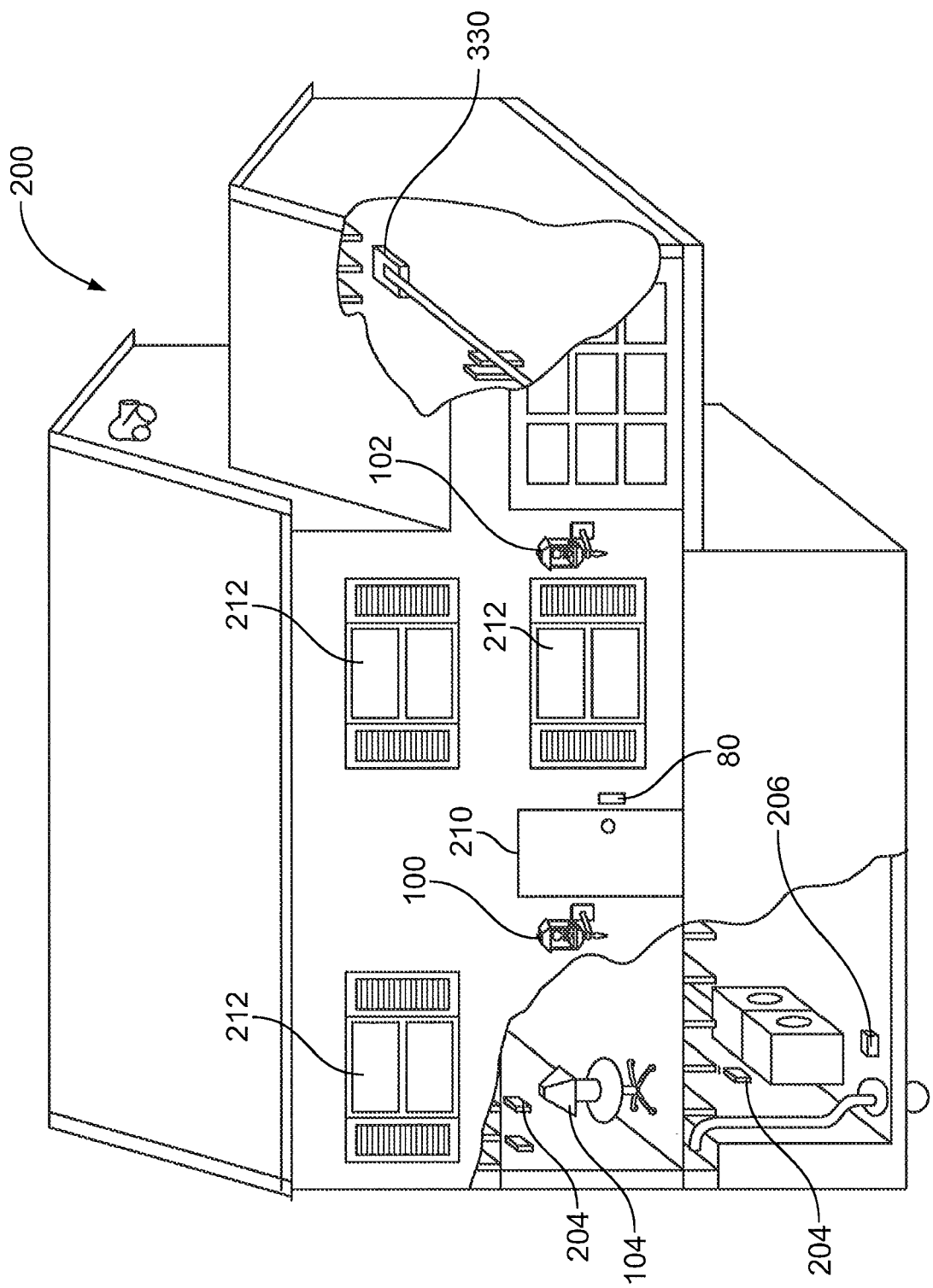
FIG. 13 shows a home installed with various features of one or more examples of a notification system described herein.

Some examples of the systems and apparatus described herein can be incorporated into a larger lighting and notification system that operates various other equipment of a home. FIG. 13 shows an example of a home 200 installed with various features of such a notification system. The system includes a control module that communicates with the various components to control operation in various locations of the home 200.

The home 200 includes an entryway 210 with a light fixture 100 positioned on the left side of the entryway 210. A primary light source unit (e.g., one of the primary light source units described herein with respect to FIGS. 1-6 and 12) with a camera, a communication system, sensors, and other equipment is installed in the light fixture 100.

A trigger device 80 is positioned on the right side and operates as a wireless doorbell. When operated, the trigger device activates a doorbell or chime inside the home in a manner similar to that of typical doorbell systems.

The control unit can be configured to effect illumination of the light level of the light source so that motion at the entryway 210 can be detected and so that the camera can capture digital images when a visitor is present at the entryway. When the trigger device 80 is activated (e.g., when the doorbell activation interface button is pressed), a door chime rings within the house, and a notification signal is sent to the control unit. In response to receiving the notification signal, the control unit may effect transmission of a notification signal to a remote device via a network.

A second light fixture 102 is positioned to the right of a lower window 212. A secondary light source unit (e.g., as described herein with respect to FIGS. 9-12) is installed in this second light fixture 102. Accordingly, the secondary light source unit can be configured to turn on automatically whenever the primary light source unit at the entryway 212 turns on or in response to other events or situations as described herein.

The home 200 also includes a plurality of exterior windows 212, which can be equipped with sensors and transmitters that communicate with the control unit. In this manner the control unit can receive information from the window sensors that can help determine home lighting and security settings.

The home 200 also includes a table lamp 104 or other interior lighting device (e.g., ceiling lights, floor lamps, internal track lighting, etc.) that provides interior lighting in the home 200. The table lamp 104 can also include a light source unit of the variety described herein. For example, the light source unit can include sensors, cameras, and communication equipment that facilitate interaction with a home network and/or control unit. In some examples, the light source unit in the lamp 104 simply communicates with the control unit so that the lighting of the lamp can be effectively controlled via the control unit, thereby enabling control from a remote device via a network. That is, the homeowner can control the interior lighting of the home via a smart phone, tablet, or other computing device via the control unit through a network.

The home 200 is also equipped with other sensors and equipment that communicate with the control unit. For example, the home 200 includes smoke and CO alarms 204 on each level. These sensors can be equipped to communicate with the control unit so that the control unit can take effective security and safety measures based on feedback provided by these sensors and equipment. The home may also have moisture sensors 206 that communicate with the control unit to provide an early notice of flooding or other potential water damage issues.

The home 200 is also equipped with a garage video monitor system 330, shown in connection with a moveable barrier operator (e.g., a garage door opener) in the home's garage. The garage video monitor system 330 can include a light source unit (as described herein) installed in a light fixture in or near a garage so as to illuminate the area outside or within the garage.

When the garage door opener and/or barrier device is actuated, a device (e.g., a camera) installed in or around the light fixture is signaled to look for and/or detect motion and to capture still images and/or video when motion is detected. Alternatively, if motion was detected shortly before the activation of the garage door opener, then the camera may have been activated by the motion and stored video and/or still images taken about the entrance of the garage in a memory storage device (either locally or remotely). The video and/or images associated with the activation of the garage door opener can then be sent to a remote device (e.g. a mobile device) as a notification of someone leaving or returning to the garage.

When installed in connection with a light fixture the system can be used to detect motion in an area through a camera or other similar devices, such as a PIR sensor, and begin to take still images and/or video. The video and/or images can be stored locally on a storage device (e.g., a hard drive) or uploaded (e.g., via the internet) to servers in the cloud and cached, waiting for trigger event such as the actuation of a door bell button. Once a trigger event occurs, the system identifies the images previously uploaded to the cloud, and can send those images (e.g., by sending them immediately) as a notification to the interested parties via the internet or mobile device.

The present disclosure also provides examples of a method of adjusting a lighting level of a lighting system. The lighting system can be any of the lighting systems described herein. For example, a lighting system can include a primary light source arranged to illuminate a first lighting area and a secondary light source arranged to illuminate a second lighting area. In general, at least a portion of the first lighting area does not overlap with the second. For example, the first lighting area can be an area at a building entryway, and the second lighting area can be along a path that leads to the building entryway.

Figure 14:
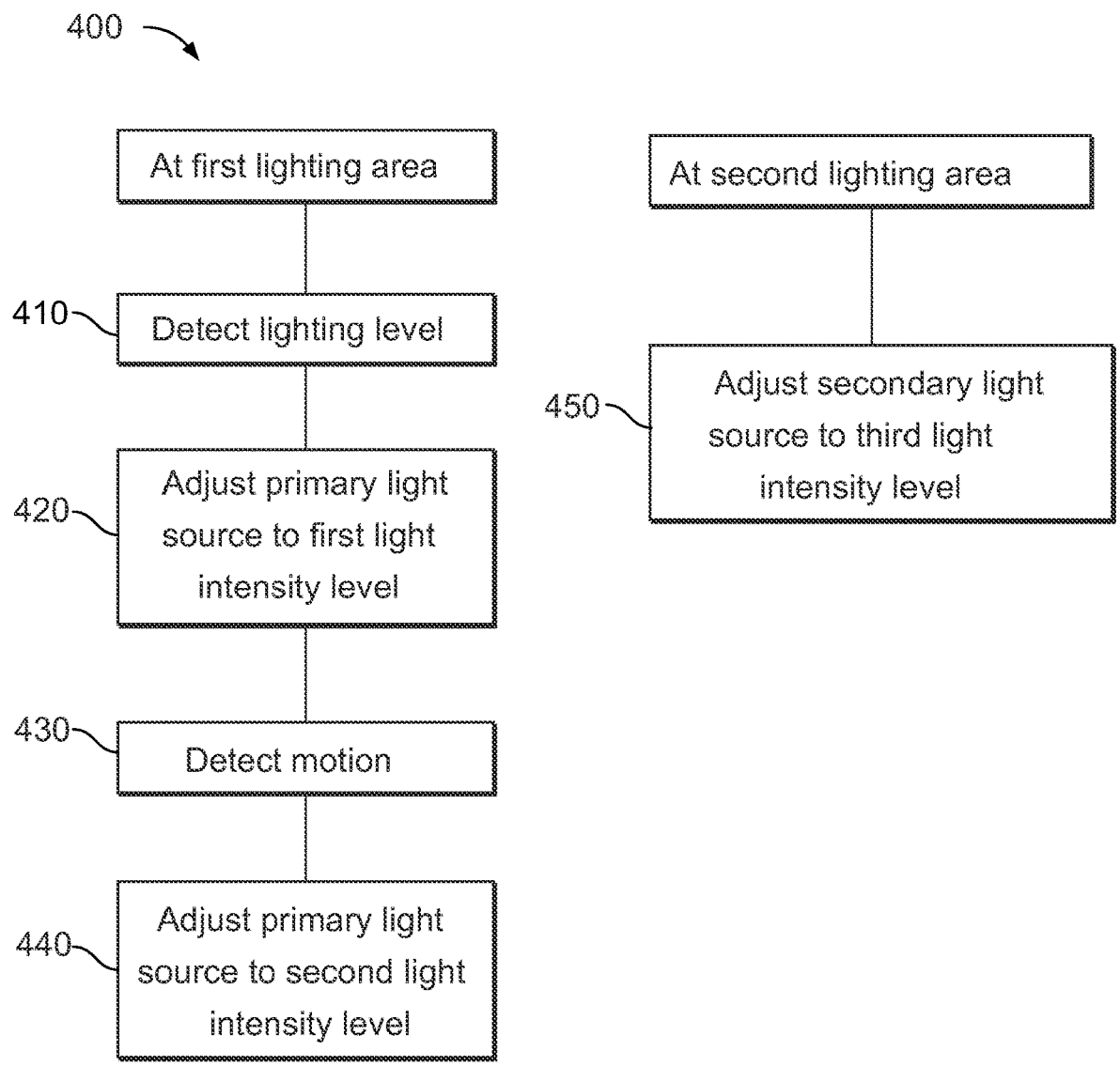
FIG. 14 is a flow diagram of an example method for adjusting lighting levels in a lighting system in accordance with one or more exemplary embodiments described herein.

FIG. 14 is a flow diagram showing examples of possible steps of a method 400. At step 410, the method 400 detects a lighting level at a first lighting area with a first light sensor or determines the ambient lighting levels or sunset/sunrise times as outlined herein. For example, step 410 can include determining or detecting the lighting level at a building entryway with a light sensor installed at the entryway or through stored sunrise and sunset times for the installed geographic location. In some implementations when utilizing a light sensor, if the lighting level is above a minimum threshold (e.g., it is still daylight), the method may take no action, but continue to monitor the lighting level. However, if the lighting level is below a minimum threshold (which can occur, for example, as darkness settles in), the method proceeds to step 420. Alternatively, in other implementations, the method may detect ambient lighting levels by comparison of stored sunset and sunrise times with the local time. If it is determined that that the lighting level is below a minimum threshold by comparing sunset times with the local time, the method may proceed to step 420. Additionally and/or alternatively, detecting of lighting levels may also be adjusted and/or modified by the user through preset controls or user defined settings. For example, the user may prefer that the lighting unit may come on a predetermined time period before sunset or after sunset. Detecting of the lighting levels and then adjusting of the primary light source to the first lighting level at step 420 may be modified accordingly based upon the user defined settings.

In some examples, the minimum threshold can be a lighting level that allows a motion sensor to effectively detect motion at the entryway. However, the minimum threshold can be at a relatively low level to conserve electricity when the natural lighting levels are sufficient for the intended operation of the system.

At step 420, the primary light source light intensity is increased to a first light intensity level in response to the detecting a lighting level below a predetermined threshold through either the light sensor or other methods as outlined herein. Thus, when the light level is too low for the motion sensor (or camera acting as a motion sensor) to operate effectively, the method will turn on, or increase the light intensity of the primary light source. The first light intensity level can be high enough to facilitate operation of functionality without being so high as to be distracting.

At step 430, the method includes monitoring for and/or detecting motion in the first lighting area with a motion sensor. It should be noted that step 430 operates independent of steps 410 and 420. That is, even if the lighting level is above a threshold so that the method has not proceeded to step 420, the method 400 includes continuing to monitor and detect motion at step 430.

If and when motion is detected, the primary light source light intensity increases to a second light intensity level at step 440. The second light intensity level is generally of a higher intensity than the first light intensity level. For example, the second light intensity level is generally configured to generate sufficient light so that a camera associated with the primary light source can effectively capture higher quality digital images in the lighting area illuminated by the primary light source. Optionally, the primary light source may only increase light intensity if the light level is below a threshold. For example, step 440 may not be executed adjust the light intensity of the primary light source if the natural light level is sufficient to allow the camera to capture digital images of sufficient quality, i.e., to ascertain identity of a person at the entryway. Thus, in periods where natural daylight is sufficient, step 440 may not be executed to adjust the light level of the primary light source.

Next, the light intensity of a secondary light source increases to a third light intensity level at step 450 in response to one or more of a number of events. The third light intensity level can be equal to one of the first and second light intensity levels of the primary light source, or it can be an entirely independent level. For example, the third lighting level can be configured to provide track lighting along a pathway to a building entryway, or it can be configured to illuminate trespassers.

In some examples the secondary light source intensity adjusts at step 450 to a third light intensity level in response to the primary light source adjusting to the first or second light intensity levels. Accordingly, in some examples, step 450 includes adjusting the secondary light source whenever the primary light source is also adjusted.

Optionally, the secondary light source intensity adjusts at step 450 in response to a motion sensor detecting motion in the lighting area illuminated by the primary light source or another light source of the lighting system. For example, the lighting level of the secondary light source may adjust in response to motion detected in the lighting region of the secondary light source, the lighting region of the primary light source, the lighting region of another light source, and/or another region altogether (e.g., a lighting region of a garage of a home).

In other examples, the secondary light source adjusts intensity at step 450 in response to the secondary light source receiving an instruction signal from a control unit of the lighting system. The instruction signal can be sent in response to a remote device sending a signal to the lighting system via a network. For example, a user may transmit an instruction via an interface on a smart phone via a network to turn off track lighting, thereby triggering a control unit to send an instruction signal to the secondary light source.

In still further examples, the secondary light source adjusts intensity at step 450 in response to detecting, with a light sensor or using the alternative determination of ambient lighting levels, an increase in lighting level in at least one of the first lighting area and the second lighting area. For example, the secondary light source can be configured to automatically adjust in intensity when an associated light sensor or other method determines that another light source in the system has adjusted. Additionally and/or alternatively, the secondary light source can be configured to automatically adjust in intensity without the aid of a light sensor, for example, when an associated control unit effects the adjustment of a light intensity level of another light source.

One example of the presently described in operation is as follows. A person walks up to the entrance to a home. The system detects the presence of the person and captures several time lapsed still images (or a video image). The captured images or video are uploaded to cloud servers and stored, waiting for an event to take place. If within a certain amount of time (e.g. 10 seconds) a doorbell trigger device is actuated, then the system sends a notification that a visitor is at the door to a remote mobile device. Via the notification, a user can then access the captured images or video. For example, the notification may include the images (e.g., as an attachment), or the notification may include a link to a website or server address where the images are stored, or the notification may open up an application on the mobile device that provides access to the images.

In some examples, the notification can open or offer to open notification software on the mobile device that presents a user with the ability to stream live video or audio from the mobile device and/or otherwise communicate with the visitor through the system.

The presently disclosed system provides a cost effective way to remotely transmit notifications with images, video, and two-way audio upon activation of a doorbell switch. In some embodiments, the notification can include a link that can be used to connect to a live video and audio stream. The system can provide quick notification by uploading images and preparing for deliver up actuation of a doorbell button.

In various examples, the detection of the light levels may be accomplished either by direct sampling of ambient light or through determination of sunset and sunrise times as outlined herein. Method steps and other descriptions set forth herein include both implementations of utilizing a sensor or, alternatively, determining sunset and sunrise times as well as user defined adjustments of when automated on and off times for the light sources.

Another example of operation is as follows. A light sensor detects that light levels have dropped below a threshold or it is determined that sunset conditions exist, so a primary light source increases to a first lighting level. At the first lighting level a motion detector (or camera acting as a motion detector) is able to detect motion at an entryway. A visitor walks up to the entrance to a home. The system detects the presence of the person, responsively increases the light level of the primary light source to a second light level, and captures several time lapsed still images (or a video image). In response to the lighting adjustment, several secondary light sources around the home also activate, providing security lighting to various areas of the home (e.g., all windows, doors, and other points of entry). The captured images or video are uploaded to cloud-based or local server(s) and stored, waiting for an event to take place. Next, the system detects, via a trigger device, that the visitor has attempted a forcible entry into the home (e.g., via a break glass sensor, a tilt sensor, an open door sensor, etc.) and immediately sends a trigger signal to a control unit, which in turn sends a notification signal to a remote device via a network. A homeowner receiving the notification can view captured images and/or a live video feed of the home. Via the remote device the homeowner can also activate all lighting inside and around the home, notify authorities (e.g., the local police), and activate additional security cameras within the home, and trigger home security alarms.

The present disclosure provides an easy way to install a system that controls lighting, monitors audio and/or video, detects and sends notifications form a door bell, door sensors, window sensors, smoke alarms, CO alarms, other audible event notifications, and other wireless devices around the home without having to run separate power to the system, plug in a power supply somewhere, or make a battery operated device/communication hum, as it can integrate several pieces of equipment into one simple assembly.

The presently disclosed system can be provided at a low cost due to availability of electrical power and the positioning lighting around entrances and exits, as building codes often require lighting to be installed at entry points of a home or building. The presently disclosed system also offers a lower cost way to achieve operation at night due to the use of and control of light source at entry points.

The presently disclosed system can use a camera to detect motion and capture video and/or images that can be uploaded to the cloud and prepared for delivery as a notification in the event the doorbell button is actuated. This can allow for quicker notifications of the presence of someone at the entrance. The present technology provides advantages in that it combines existing light fixtures with controlled lighting, camera, detectors, and audio, and it also establishes a portal of communication to other devices in the.

The present disclosure describes preferred embodiments and examples of the present technology. It should be understood that features described with respect to one embodiment could be employed in other described embodiments, regardless of whether those features are specifically described with respect to that embodiment. The embodiments shown in the drawings, if any, and as described above are merely for illustrative purposes and not intended to limit the scope of the invention. Moreover, those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. All references cited in the present disclosure are hereby incorporated by reference in their entirety.

The invention claimed is:
1. A lighting and notification apparatus comprising:
   a light source unit installable within a light fixture that is mounted at a building entryway and connected to an electrical power supply so that the electrical power supply provides electrical power to the light source unit when installed in the light fixture;
   a motion sensor to detect motion, the motion sensor in electrical communication with the light source unit;
   a camera to capture digital images at the building entryway, the camera in electrical communication with the light source unit; and a control unit in communication with the camera and a trigger device;

wherein the light source unit provides electrical power from the electrical power supply to the motion sensor and the camera;

wherein the control unit captures digital images by the camera in response to signals from the motion sensor detecting motion at the building entryway; and wherein the control unit adjusts the light intensity of the light source unit to a first light intensity based on a determined sunset time, the determined sunset time based on a geographic location obtained by the control unit through a communication device of the control unit.

2. The lighting and notification apparatus of claim 1 wherein the communication device of the control unit transmits an IP address associated with a network in communication with the communication device.

3. The lighting and notification apparatus of claim 2 further including a storage device in communication with the control unit, the control unit storing the sunset time on the storage device.

4. The lighting and notification apparatus of claim 1 wherein the control unit transmits a notification signal in response to receipt of a signal received by the trigger device.

5. The lighting and notification apparatus of claim 1 further including a light switch in operable control of the electrical power supply providing electrical power to the light source unit.

6. The lighting and notification apparatus of claim 1 wherein the control unit detects an ambient light level by the determined sunset time.

7. The lighting and notification apparatus of claim 6 wherein the control unit updates the determined sunset time on a regular basis.

8. The lighting and notification apparatus of claim 3 wherein the control unit adjusts light intensity of light emitted from the light source unit to the first light intensity prior to the determined sunset time based upon user defined settings stored in the storage device.

9. The lighting and notification apparatus of claim 2 wherein the control unit receives a geographic identifier in response to transmitting the IP address, the control unit obtaining the determined sunset time based upon an entry in a lookup table related to the geographic identifier and stored in a storage device associated with the control unit.

10. The lighting and notification apparatus of claim 4 wherein the control unit adjusts the light intensity of the light source unit in response to receiving the signal sent from the trigger device in response to a trigger event.

11. The lighting and notification apparatus of claim 2 wherein the control unit receives the determined sunset time in response to transmitting the IP address.

12. A lighting and notification apparatus comprising:
a light source unit installable within a light fixture mounted at a building entryway;
a motion sensor configured to detect motion at the building entryway;
a camera configured to capture digital images at the building entryway; and
a control unit in communication with the light source unit, the motion sensor and the camera;
wherein the control unit is operable to adjust the light intensity of the light source unit to a first light intensity based upon a determined sunset time;
the control unit further being operable to adjust the light intensity of the light source unit to a second light intensity in response to the motion sensor detecting motion at the building entryway;
the control unit further being operable to
capture digital images by the camera in response to the motion sensor detecting motion at the building entryway; and
transmit a notification signal via a network in response to a trigger event.

13. The lighting and notification apparatus of claim 12 wherein the determined sunset time is obtained by the control unit by transmitting an obtained IP address and utilizing the IP address to obtain a localized sunrise and sunset time.

14. A lighting apparatus comprising:
a light source unit having a light source, the light source unit installable within a light fixture;
the light source unit having a controller and a communication module;
the communication module configured to communicate with a control unit of a lighting system having a primary light source unit with a primary light source;
the controller configured to adjust the light source units light source's light intensity level in response to at least one of:
the communication module receiving an instruction signal from the control unit of the lighting system, the instruction signal sent in response to a detected increase in light intensity of the primary light source;
the communication module receiving the instruction signal from the control unit of
the lighting system, the instruction signal sent in response to the detection of motion within a lighting region of the lighting system; and
the communication module receiving the instruction signal from the control unit of the lighting system, the instruction signal sent in response to the control unit determining the ambient light intensity is below a threshold based upon a determined sunset time.

15. The lighting apparatus of claim 14 wherein the control unit is integrated into the primary light source unit.

16. The lighting apparatus of claim 14 wherein the light source unit is one of a plurality of secondary light source units, each of the plurality of secondary light source units having a light source installable within a light fixture and having a controller and a communication module.

17. The lighting apparatus of claim 16 wherein the control unit is configured to illuminate a first portion of the plurality of secondary light source units in response to a first event and is configured to illuminate all of the plurality of secondary light source units in response to a second event.

18. The lighting apparatus of claim 17 wherein the first portion of the secondary light source units is a subset of the plurality of secondary light source units and the first event is an instruction signal to illuminate a subset of the lighting region.

19. The lighting apparatus of claim 16 wherein the control unit is configured to
illuminate the plurality of secondary light source units at a first intensity level in response to a first event and is configured to illuminate the plurality of secondary light source units at a second intensity level in response to a second event.

20. The lighting apparatus of claim 14 wherein the determined sunset time is based upon light input to an ambient light sensor.

* * * * *